United States Patent
Imai et al.

(10) Patent No.: US 7,851,568 B2
(45) Date of Patent: Dec. 14, 2010

(54) VINYLPYRROLIDONE-BASED COPOLYMER AND A METHOD FOR PRODUCTION THEREOF

(75) Inventors: Daisuke Imai, Suita (JP); Keiko Izumi, Toyonaka (JP); Yoshitomo Nakata, Nishinomiya (JP)

(73) Assignee: Nippon Shokubai Co., Ltd., Osaka (JP)

( * ) Notice: Subject to any disclaimer, the term of this patent is extended or adjusted under 35 U.S.C. 154(b) by 608 days.

(21) Appl. No.: 11/907,906

(22) Filed: Oct. 18, 2007

(65) Prior Publication Data
US 2008/0154001 A1   Jun. 26, 2008

(30) Foreign Application Priority Data
Oct. 18, 2006   (JP) .............................. 2006-284201

(51) Int. Cl.
*C08F 26/10*   (2006.01)
(52) U.S. Cl. ......................................... 526/79; 526/264
(58) Field of Classification Search .................. 526/79, 526/264
See application file for complete search history.

(56) References Cited

U.S. PATENT DOCUMENTS

| | | | |
|---|---|---|---|
| 4,816,534 A | 3/1989 | Nuber et al. | |
| 5,858,592 A | 1/1999 | Nguyen et al. | |
| 6,127,074 A | 10/2000 | You et al. | |
| 7,629,425 B2 * | 12/2009 | Dobrawa et al. | ............ 526/264 |

FOREIGN PATENT DOCUMENTS

| | | |
|---|---|---|
| JP | 63-156810 | 6/1988 |
| JP | 9-34154 | 2/1997 |
| JP | 9-208801 | 8/1997 |
| JP | 2002-179743 | 6/2002 |
| JP | 2003-113220 | 4/2003 |
| JP | 2003-286381 | 10/2003 |
| WO | 2006/115116 | 11/2006 |

* cited by examiner

*Primary Examiner*—Bernard Lipman
(74) *Attorney, Agent, or Firm*—Wenderoth, Lind & Ponack, L.L.P.

(57) ABSTRACT

There is provided a vinylpyrrolidone-based copolymer having as essential components N-vinylpyrrolidone and hydroxyl group-containing (meth)acrylate, which gives a favorable crosslinked coating film, and a method for production by which the copolymer is easily obtained.

A vinylpyrrolidone-based copolymer of the present invention contains a constitutional unit derived from N-vinylpyrrolidone and a constitutional unit derived from hydroxyl group-containing (meth)acrylate at a specific ratio, in which a K value according to Fikentscher is 12 or more, water insoluble matter is 0.5% by mass (on the basis of solid content) or less, and each content of iron, nickel, chromium, sodium and calcium is 500 ppb (on the basis of mass: the same hereinafter) or less, or electrical conductivity of a 10% by mass-aqueous solution of the vinylpyrrolidone-based copolymer is 35 µS/cm or less.

12 Claims, No Drawings

VINYLPYRROLIDONE-BASED COPOLYMER AND A METHOD FOR PRODUCTION THEREOF

The present application claims the benefit of priority from Japanese Patent Application No. 2006-284201, filed on Oct. 18, 2006, all the contents of which are incorporated herein by reference.

BACKGROUND OF THE INVENTION

1. Field of the Invention

The present invention relates to a vinylpyrrolidone-based copolymer having as essential components N-vinylpyrrolidone and hydroxyl group-containing (meth)acrylate, such as 2-hydroxyethyl (meth)acrylate, and a method for production thereof.

2. Description of the Related Art

It is known that a copolymer of N-vinylpyrrolidone and 2-hydroxyethyl (meth)acrylate (occasionally referred to as "NVP/HE(M)A copolymer" hereinafter) is useful as a raw material polymer of a curable resin composition, which allows a film having a water resistance and hydrophilicity together because a structure thereof has both a hydrophilic pyrrolidone group and a hydroxyl group reactable with a crosslinking agent such as isocyanate (see Japanese Patent Laid-open (Kokai) Publication No. 2003-113220). The copolymer is utilized also as a preferable polymer in a curable resin composition (see Japanese Patent Laid-open (Kokai) Publication No. 2003-286381) containing as essential components a polymer having an N-vinylamide unit, a compound having two or more functional groups for reacting with active hydrogen, and a polyvalent metallic compound. The application of the copolymer to a semiconductor cleaning agent and a protective film is expected because the copolymer has properties such as high adsorptive property, water-solubility and film-forming ability.

The NVP/HE(M)A copolymer is conventionally obtained by adding 2-hydroxyethyl (meth)acrylate to water (solvent) containing N-vinylpyrrolidone and a polymerization initiator and carrying out the polymerization, and the process is generally employed as a process for production of the NVP/HE(M)A copolymer.

However, in the case where a curable resin composition employing the NVP/HE(M)A copolymer as a raw material polymer is formed into a film and crosslinked, the copolymer obtained by a conventional technique causes a problem in which the surface smoothness of the formed crosslinked coating film is deteriorated, and gel is swollen during washing with water for removing the unreacted raw material, and the like, after crosslinking as well as a problem in which the uniformity of the formed crosslinked coating film is lowered. Another problems in which the crosslinked coating film employing the conventional NVP/HE(M)A copolymer as a raw material polymer has a low water resistance arise.

The above mentioned problems are problems common to a vinylpyrrolidone-based copolymer employing hydroxyl group-containing (meth)acrylate typified by 2-hydroxyethyl (meth)acrylate as the other raw material monomer.

The NVP/HE(M)A copolymer obtained by the conventional technique is high in the content of an ionic component such as metal, and some applications of the copolymer cause a problem in electrical conductivity, coloring, and the like, so that it is also desired that the content of the ionic component such as metal in the NVP/HE(M)A copolymer be decreased.

In addition, an NVP homopolymer having no hydroxyl groups with a high reactivity is occasionally contained in a large amount in the NVP/HE(M)A copolymer obtained by the conventional technique. In this case, the problem in which an uncrosslinked portion is made in the coating film and the water resistance of the coating film is deteriorated in forming the crosslinked coating film arises. Under such circumstances, the NVP/HE(M)A copolymer having a low NVP homopolymer content is desired.

Therefore, the problem to be solved by the present invention is to provide a vinylpyrrolidone-based copolymer with a low metal content having as essential components N-vinylpyrrolidone and hydroxyl group-containing (meth)acrylate, such as 2-hydroxyethyl (meth)acrylate, which gives a favorable crosslinked coating film without causing the above-mentioned problems, and a method for production by which the copolymer is easily obtained.

SUMMARY OF THE INVENTION

The inventors of the present invention have made earnest studies for solving the above-mentioned problems. As a result, they have found out that, when the conventional NVP/HE(M)A copolymer is used as a raw material polymer, the above-mentioned problems are caused by increasing water insoluble matter (that is, gel matter) and widening molecular-weight distribution for the reason that 2-hydroxyethyl (meth) acrylate is subject to crosslinking reaction during polymerization. That is to say, in the case where a curable resin composition employing the NVP/HE(M)A copolymer obtained by the conventional technique as a raw material polymer is formed into a film and crosslinked, a large amount of water insoluble matter causes a problem in which the surface smoothness of the crosslinked coating film is deteriorated and gel is swollen during washing with water after crosslinking, and additionally wide molecular-weight distribution causes a problem in which the uniformity of the crosslinked coating film is lowered. The inventors of the present invention have further found out that the water resistance of the crosslinked coating film is influenced by a K value of the NVP/HE(M)A copolymer.

Further, the inventors of the present invention have reached the following findings to complete the present invention through various studies and experiments on a vinylpyrrolidone-based copolymer with a low content of the ionic component (such as metal), which can achieve low water insoluble matter content and/or low degree of dispersion, in addition to having as essential components N-vinylpyrrolidone and hydroxyl group-containing (meth)acrylate, and a method for production, which easily gives this copolymer. That is to say, they have found out that while setting the copolymerization ratio of N-vinylpyrrolidone and hydroxyl group-containing (meth)acrylate to a specific range, during copolymerization:

i) when polymerization reaction is performed by using a specific amount of a nitrogen-containing basic compound with respect to a monomer component and a nonionic azo initiator as a polymerization initiator, a copolymer in which the metal content is decreased and the electrical conductivity of a copolymer aqueous solution at a predetermined concentration is within a specific range is obtained, ii) when polymerization reaction is performed in a solvent containing a certain amount or more of a specific alcohol, a copolymer in which water insoluble matter is extremely low is obtained; and iii) when the K value of an N-vinylpyrrolidone/hydroxyl group-containing (meth)acrylate copolymer according to Fikentscher is 12 or more, the water resistance of the coating film formed and crosslinked by using the N-vinylpyrrolidone/ hydroxyl group-containing (meth)acrylate copolymer can be improved. Therefore, the inventors of the present invention have completed the present invention.

First, a first vinylpyrrolidone-based copolymer according to the present invention is a vinylpyrrolidone-based copolymer containing a constitutional unit (A) derived from N-vinylpyrrolidone and a constitutional unit (B) derived from hydroxyl group-containing (meth)acrylate at a ratio such that the constitutional unit (A) is 50 to 95% by mass and the constitutional unit (B) is 5 to 50% by mass with respect to the total of both, wherein the K value according to Fikentscher is 12 or more, the water insoluble matter is 0.5% by mass (on the basis of solid content) or less, and each content of iron, nickel, chromium, sodium and calcium is 500 ppb (on the basis of mass: the same hereinafter) or less.

Next, a second vinylpyrrolidone-based copolymer according to the present invention is a vinylpyrrolidone-based copolymer containing a constitutional unit (A) derived from N-vinylpyrrolidone and a constitutional unit (B) derived from hydroxyl group-containing (meth)acrylate at a ratio such that the constitutional unit (A) is 50 to 95% by mass and the constitutional unit (B) is 5 to 50% by mass, with respect to the total of both, wherein the K value according to Fikentscher is 12 or more, the water insoluble matter is 0.5% by mass (on the basis of solid content) or less, and the electrical conductivity of a 10% by mass-aqueous solution of the vinylpyrrolidone-based copolymer is 35 µS/cm or less. The electrical conductivity of the copolymer aqueous solution can be used as an index of the total ionic components contained in the copolymer. Accordingly, lower electrical conductivity denotes lower ionic component content.

Further, the present invention includes a vinylpyrrolidone-based copolymer containing a constitutional unit (A) derived from N-vinylpyrrolidone and a constitutional unit (B) derived from hydroxyl group-containing (meth)acrylate at a ratio such that the constitutional unit (A) is 50 to 95% by mass and the constitutional unit (B) is 5 to 50% by mass with respect to the total of both, wherein the K value according to Fikentscher is 12 or more, the water insoluble matter is 0.5% by mass (on the basis of solid content) or less, the degree of dispersion is 1.8 or less, and each content of iron, nickel, chromium, sodium and calcium is 500 ppb or less, or the electrical conductivity of a 10% by mass-aqueous solution of the vinylpyrrolidone-based copolymer is 35 µS/cm or less.

DETAILED DESCRIPTION OF THE INVENTION

First, the first vinylpyrrolidone-based copolymer according to the present invention is a vinylpyrrolidone-based copolymer containing a constitutional unit (A) derived from N-vinylpyrrolidone and a constitutional unit (B) derived from hydroxyl group-containing (meth)acrylate at a ratio such that the constitutional unit (A) is 50 to 95% by mass and the constitutional unit (B) is 5 to 50% by mass with respect to the total of both, wherein the K value according to Fikentscher is 12 or more, the water insoluble matter is 0.5% by mass (on the basis of solid content) or less, and each content of iron, nickel, chromium, sodium and calcium is 500 ppb (on the basis of mass: the same hereinafter) or less.

Next, the second vinylpyrrolidone-based copolymer according to the present invention is a vinylpyrrolidone-based copolymer containing a constitutional unit (A) derived from N-vinylpyrrolidone and a constitutional unit (B) derived from hydroxyl group-containing (meth)acrylate at a ratio such that the constitutional unit (A) is 50 to 95% by mass and the constitutional unit (B) is 5 to 50% by mass with respect to the total of both, wherein the K value according to Fikentscher is 12 or more, the water insoluble matter is 0.5% by mass (on the basis of solid content) or less, and the electrical conductivity of a 10% by mass-aqueous solution of the vinylpyrrolidone-based copolymer is 35 µS/cm or less. The electrical conductivity of the copolymer aqueous solution can be used as an index of the total ionic components contained in the copolymer. Accordingly, lower electrical conductivity denotes lower ionic component content.

Further, the present invention includes a vinylpyrrolidone-based copolymer containing a constitutional unit (A) derived from N-vinylpyrrolidone and a constitutional unit (B) derived from hydroxyl group-containing (meth)acrylate at a ratio such that the constitutional unit (A) is 50 to 95% by mass and the constitutional unit (B) is 5 to 50% by mass with respect to the total of both, wherein the K value according to Fikentscher is 12 or more, the water insoluble matter is 0.5% by mass (on the basis of solid content) or less, degree of dispersion is 1.8 or less, and each content of iron, nickel, chromium, sodium and calcium is 500 ppb or less, or the electrical conductivity of a 10% by mass-aqueous solution of the vinylpyrrolidone-based copolymer is 35 µS/cm or less.

In the above-mentioned first and second vinylpyrrolidone-based copolymers of the present invention, the constitutional unit (A) derived from N-vinylpyrrolidone and the constitutional unit (B) derived from hydroxyl group-containing (meth)acrylate preferably occupy 80% by mass or more of the total constitutional units of the vinylpyrrolidone-based copolymer.

A method for production of the first and second vinylpyrrolidone-based copolymers according to the present invention is a method for production of the above-mentioned vinylpyrrolidone-based copolymers by using a metallic reaction vessel, wherein polymerization is performed by using a nitrogen-containing basic compound in an amount of 0.0001 to 0.5% by mass with respect to a monomer component, a nonionic azo initiator and solvent containing an alcohol having 1 to 5 carbon atoms in an amount of 10% by mass or more (ratio with respect to the total solvent), and that polymerization reaction is performed so that 0 to 100% by mass in 100% by mass of N-vinylpyrrolidone and 0 to 10% by mass in 100% by mass of hydroxyl group-containing (meth)acrylate are initially charged into the above-mentioned reaction vessel to successively add the residual to the reaction vessel.

It is desired that alkanolamine is used as the above-mentioned nitrogen-containing basic compound in an amount of 0.01 to 0.5% by mass with respect to a monomer component, and monoethanolamine, diethanolamine and triethanolamine are recommended to be used as the above-mentioned alkanolamine.

The method for production of the vinylpyrrolidone-based copolymers of the present invention also includes a process for performing polymerization reaction by using a solvent containing an alcohol having 1 to 5 carbon atoms by 10% by mass or more (ratio with respect to the total solvent) to treat the obtained polymerization product with an ion-exchange resin, and a process for successively adding hydroxyl group-containing (meth)acrylate to a reaction solution having an unreacted N-vinylpyrrolidone concentration of 10 ppm or more until a rate of polymerization of N-vinylpyrrolidone at the time of completing the addition of hydroxyl group-containing (meth)acrylate is 98% or more to treat the obtained polymerization product with an ion-exchange resin.

Through the findings that an N-vinylpyrrolidone homopolymer amount influences physical properties of the crosslinked coating film of the copolymer, the inventors of the present invention have completed as a third vinylpyrrolidone-based copolymer according to the present invention a vinylpyrrolidone-based copolymer containing a constitutional unit (A) derived from N-vinylpyrrolidone and a constitutional unit (B) derived from hydroxyl group-containing (meth)acrylate at a ratio such that the constitutional unit (A) is of 50 to 95% by mass and the constitutional unit (B) is 5 to 50% by mass with respect to the total of both, in which the vinylpyrrolidone homopolymer content is 3% by mass (on the basis of solid content) or less.

The vinylpyrrolidone homopolymer content contained in the vinylpyrrolidone-based copolymer is preferably within the above-mentioned range since the vinylpyrrolidone-based copolymer can be obtained, in which a problem in which an uncrosslinked portion is easily made and water resistance of a coating film is low, is difficult to occur during forming this copolymer into a coating film.

A method for production of the above-mentioned third vinylpyrrolidone-based copolymer of the present invention is characterized by successively adding hydroxyl group-containing (meth)acrylate to a reaction solution having an unreacted N-vinylpyrrolidone concentration of 10 ppm or more and letting the rate of polymerization of N-vinylpyrrolidone at the end of the addition of hydroxyl group-containing (meth)acrylate becomes 98% or more. The adoption of the method allows the vinylpyrrolidone homopolymer content to be decreased so efficiently that a vinylpyrrolidone-based copolymer having a favorable coating film-forming ability is obtained.

The polymerization by using a nitrogen-containing basic compound in an amount of 0.0001 to 0.5% by mass with respect to a monomer component, a nonionic azo initiator and a solvent containing an alcohol having 1 to 5 carbon atoms by 10% by mass (ratio with respect to the total solvent) or more is a recommended embodiment of the process of the present invention.

The vinylpyrrolidone-based copolymer according to the present invention and the method for production thereof are hereinafter described in detail, and the scope of the present invention is not restricted to these descriptions and proper modifications can be performed also except for the following exemplifications within a range of deteriorating the spirit of the present invention.

[Vinylpyrrolidone-Based Copolymer]

A vinylpyrrolidone-based copolymer of the present invention (first and second vinylpyrrolidone-based copolymers; hereinafter, the case of simply referring to "a vinylpyrrolidone-based copolymer of the present invention" is the same) contains a constitutional unit (A) derived from N-vinylpyrrolidone and a constitutional unit (B) derived from hydroxyl group-containing (meth)acrylate at a ratio such that the constitutional unit (A) is 50 to 95% by mass and the constitutional unit (B) is 5 to 50% by mass with respect to the total of both. It is preferable that the constitutional unit (A) is 60 to 90% by mass and the constitutional unit (B) is 10 to 40% by mass, more preferable that the constitutional unit (A) is 65 to 85% by mass and the constitutional unit (B) is 15 to 35% by mass. When the mutual ratio (copolymerization ratio) of the constitutional unit (A) derived from N-vinylpyrrolidone and the constitutional unit (B) derived from hydroxyl group-containing (meth)acrylate is within the above-mentioned range, a copolymer can be obtained, for example, which is suitable for providing a favorable crosslinked coating film having a water resistance and hydrophilicity together. When the constitutional unit (A) derived from N-vinylpyrrolidone is more than the above-mentioned range (the constitutional unit (B) derived from hydroxyl group-containing (meth)acrylate is less than the above-mentioned range), the advantage that reactivity with a crosslinking agent is high, which is derived from hydroxyl group-containing (meth)acrylate, is difficult to be developed; on the contrary, when the constitutional unit (A) derived from N-vinylpyrrolidone is less than the above-mentioned range (the constitutional unit (B) derived from hydroxyl group-containing (meth)acrylate is more than the above-mentioned range), gelation is caused so easily that a copolymer having a large amount of water insoluble matter is caused and a copolymer having a high degree of dispersion (wide molecular-weight distribution) is caused.

Examples of a monomer component for providing the above-mentioned constitutional unit (A) derived from N-vinylpyrrolidone include N-vinylpyrrolidone (a). Examples of hydroxyl group-containing (meth)acrylate (b) for providing the above-mentioned constitutional unit (B) include 2-hydroxyethyl (meth)acrylate, hydroxypropyl (meth)acrylate, hydroxybutyl (meth)acrylate and 2-hydroxyethoxyethyl (meth)acrylate; among them, 2-hydroxyethyl (meth)acrylate is preferable in view of reactivity with a crosslinking agent and the water resistance of a crosslinked coating film. As a 2-hydroxyethyl (meth)acrylate, 2-hydroxyethyl methacrylate (HEMA) may be employed, but yet 2-hydroxyethyl acrylate (HEA) is more preferable. The reason therefor is that 2-hydroxyethyl acrylate (HEA) is so high in hydrophilicity as to have the advantages that hydrophilicity is improved and water washability in an uncrosslinked portion becomes favorable in the crosslinked coating film obtained from the vinylpyrrolidone-based copolymer employing it as a raw material monomer, and is so favorable in crosslinking reactivity as to have the advantage that reactivity between the vinylpyrrolidone-based copolymer and the crosslinking agent is improved.

The vinylpyrrolidone-based copolymer of the present invention may have, in addition to the constitutional unit (A) derived from N-vinylpyrrolidone and the constitutional unit (B) derived from hydroxyl group-containing (meth)acrylate, a constitutional unit derived from monomers copolymerizable with N-vinylpyrrolidone (other monomers), which are exemplified in the paragraph of [Method for production of vinylpyrrolidone-based copolymer] as described below. In the case of having a constitutional unit derived from other monomers, a content of the constitutional unit (A) derived from N-vinylpyrrolidone and the constitutional unit (B) derived from hydroxyl group-containing (meth)acrylate is preferably 80% by mass or more in the total constitutional units. That is, the ratio of the above-mentioned constitutional unit derived from other monomers is preferably less than 20% by mass, more preferably less than 10% by mass with respect to the total constitutional units.

With regard to the vinylpyrrolidone-based copolymer of the present invention having the above-mentioned constitution, a K value according to Fikentscher is preferably 12 or more, more preferably 15 or more and far more preferably 20 or more. The K value of less than 12 brings a tendency to deteriorate water resistance in the case of forming the crosslinked coating film. The upper limit of a K value in the vinylpyrrolidone-based copolymer of the present invention is not restricted and yet preferably 90 or less, more preferably 80 or less, far more preferably 60 or less and most preferably 40 or less. The reason therefor is that the K value according to Fikentscher of more than 90 brings a tendency to render water washability after film formation insufficient in the case of forming the crosslinked coating film, for example.

In the present invention, a K value is a value in which a vinylpyrrolidone-based copolymer is dissolved in an optional solvent for dissolving the copolymer up to a concentration of 1% by mass and then viscosity of the solution is measured by a capillary viscometer at 25° C. to calculate from these measured values by the following Fikentscher formula:

$$(\log \eta_{rel})/C=[(75K_0^2)/(1+1.5K_0C)]+K_0$$

$K=1000K_0.$

In the formula, C denotes g number of the vinylpyrrolidone-based copolymer in the 100 mL-solution, $\eta_{rel}$ denotes viscosity (relative viscosity, measured value) of the vinylpyrrolidone-based copolymer solution in the optional solvent and $K_0$ denotes a parameter related to K value.

With regard to a vinylpyrrolidone-based copolymer of the present invention, water insoluble matter is 0.5% by mass or less on the basis of solid content (that is, water insoluble matter content on the basis of solid content is 0.5% by mass or less), preferably 0.3% by mass or less and more preferably 0.1% by mass or less. Thus, when water insoluble matter content on the basis of solid content is 0.5% by mass or less, for example, a problem in which the surface smoothness of the formed crosslinked coating film is deteriorated during forming into a film and crosslinking, and gel is swollen during washing with water for removing the unreacted raw material after crosslinking can be avoided. The water insoluble matter content of the copolymer on the basis of solid content is measured by a method described in the following Examples.

With regard to the first vinylpyrrolidone-based copolymer according to the present invention, in addition to the above-mentioned properties, each content of iron, nickel, chromium, sodium and calcium (these metal elements are occasionally referred to together as metals hereinafter) is preferably 500 ppb or less. These metals occasionally become the cause of a problem on coloring and insulation failure in the case of being used as raw materials for cosmetics and insulating materials; in particular, the content of such a metal is preferably low. When the metal amount contained in the vinylpyrrolidone-based copolymer exceeds the above-mentioned range, the unpreferable problem as described above is occasionally caused. Accordingly, each content of the metals is preferably 400 ppb or less, more preferably 300 ppb or less and far more preferably 200 ppb or less. In addition to the above-mentioned metals, it is recommended that each content of potassium, zinc, manganese, magnesium, aluminum, copper, lead and silicon be similarly decreased. Each content of the above-mentioned metals is measured by a method described in the paragraph of the following Examples.

With regard to the second vinylpyrrolidone-based copolymer according to the present invention, the electrical conductivity of a 10% by mass-aqueous solution is 35 μS/cm or less, preferably 33 μS/cm or less and more preferably 30 μS/cm or less. The electrical conductivity of a 10% by mass-aqueous solution is a value measured by a method described in the following Examples, and lower value represents smaller amount of ionic impurities existing in the copolymer. Accordingly, the vinylpyrrolidone-based copolymer having a value in the above-mentioned range is suitably used for semiconductor materials and insulating materials.

In addition to the above-mentioned properties, with regard to a vinylpyrrolidone-based copolymer of the present invention, degree of dispersion is preferably 1.8 or less, more preferably 1.75 or less and far more preferably 1.70 or less. Thus, when the degree of dispersion is 1.8 or less, for example, a problem in which the uniformity of the formed crosslinked coating film is deteriorated in forming into a film and crosslinking can be avoided. The degree of dispersion is a parameter calculated by weight-average molecular weight/number-average molecular weight, and can be measured by a method described in the following Examples.

It is considered that a vinylpyrrolidone-based copolymer, which simultaneously satisfies all of the above-mentioned properties, is the most preferable embodiment in the present invention.

The third vinylpyrrolidone-based copolymer of the present invention contains a constitutional unit (A) derived from N-vinylpyrrolidone and a constitutional unit (B) derived from hydroxyl group-containing (meth)acrylate at the above-mentioned ratio, in which the vinylpyrrolidone homopolymer content is 3% by mass or less (on the basis of solid content) in 100% by mass of the copolymer.

As described above, the vinylpyrrolidone homopolymer has no hydroxyl groups with a high reactivity, so that an uncrosslinked portion is occasionally formed and results in the deterioration of water resistance of the coating film in forming the vinylpyrrolidone-based copolymer containing such a vinylpyrrolidone homopolymer into the crosslinked coating film. Accordingly, lower vinylpyrrolidone homopolymer content is more preferable, preferably 2% by mass or less and more preferably 1% by mass or less. Needless to say, the case of containing no vinylpyrrolidone homopolymer is the most preferable. The vinylpyrrolidone homopolymer amount contained in the copolymer is measured by a method described in the following Examples.

In addition, the third vinylpyrrolidone-based copolymer of the present invention preferably has the same properties as the above-mentioned first and second vinylpyrrolidone-based copolymers (electrical conductivity, K value, metal content, water insoluble matter and degree of dispersion), and a vinylpyrrolidone-based copolymer, which satisfies all of these properties, is preferably used for the following various applications.

With regard to a 30% by mass-aqueous solution of the first to third vinylpyrrolidone-based copolymers of the present invention, Hazen color number measured in conformance with JIS-K3331 is preferably 100 or less, more preferably 50 or less and far more preferably 20 or less. The above-mentioned Hazen color number is a scale for degree of coloring of the vinylpyrrolidone-based copolymers according to the present invention, and lower numerical value thereof represents more colorless and transparent.

With regard to the first to third vinylpyrrolidone-based copolymers of the present invention, the formic acid content is preferably 100 ppm or less, more preferably 70 ppm or less, far more preferably 40 ppm or less and most preferably 20 ppm or less. Formic acid is produced by oxidative decomposition of N-vinylpyrrolidone due to dissolved oxygen slightly existing in the polymerization reaction system. Formic acid has a property of corrosiveness, there is a possibility of resulting in metal elution from a metallic reaction vessel due to the corrosiveness.

N-vinylpyrrolidone used as a monomer component of the first to third vinylpyrrolidone-based copolymers of the present invention produces 2-pyrrolidone when subject to hydrolysis. The inclusion of 2-vinylpyrrolidone as this hydrolysis product in the copolymer brings a possibility of causing a problem such as yellowing of the coating film and the deterioration of water resistance in forming the copolymer into the crosslinked coating film. Accordingly, 2-pyrrolidone amount contained in the vinylpyrrolidone-based copolymers according to the present invention is preferably 1% by mass or less, more preferably 0.5% by mass or less, far more preferably 0.3% by mass or less and most preferably 0.1% by mass or less.

A method for production of the above-mentioned first to third vinylpyrrolidone-based copolymers according to the present invention is not particularly limited, which copolymers can be produced by conventionally known processes; the following process for production of the vinylpyrrolidone-based copolymers of the present invention allows the above-mentioned first to third vinylpyrrolidone-based copolymers thereof to be easily obtained.

The application of the vinylpyrrolidone-based copolymers of the present invention is not limited, which copolymers can be used for all applications. Examples of the applications include a dispersant of various inorganic matter or organic matter, a flocculant, a thickener, a tackiness agent, an adhesive, a surface coating agent and a crosslinkable composition; more specific examples thereof include a mud dispersant, a cement material dispersant, a cement material thickener, a detergent builder, a detergent a color migration inhibitor, a heavy metal capture agent, a metal surface-treatment agent, a dyeing assistant, a dyestuff fixing agent, a foam stabilizer, an emulsion stabilizer, an ink dyestuff dispersant, a water-based ink stabilizer, a coating pigment dispersant, a coating thickener, a pressure-sensitive adhesive, a paper adhesive, a glue stick, a medical adhesive, a patch tackiness agent, a face pack tackiness agent, a resin filler dispersant, a recording paper coating agent, an ink-jet paper surface-treatment agent, a photosensitive resin dispersant, an antistatic agent, a humectant, a water-absorbent resin raw material, a fertilizer binder, a high-molecular crosslinking agent, a resin compatibilizer, a photographic chemical additive, a cosmetic dispensing additive, a hair conditioner assistant, a hair spray additive, a sunscreen composition additive, and the like. Examples of applications in which a merit thereof can be utilized most effectively include a raw material polymer for a curable resin composition providing a film having a water resistance and hydrophilicity together, which film is utilized as a crosslinked coating film.

[Method for Production of Vinylpyrrolidone-Based Copolymer]

A first method for production of the vinylpyrrolidone-based copolymer of the present invention is a method for production of the above-mentioned first and second vinylpyrrolidone-based copolymers of the present invention by employing a metallic reaction vessel, in which polymerization is performed by using a nitrogen-containing basic compound in an amount of 0.0001 to 0.5% by mass with respect to a monomer component, a nonionic azo initiator and a solvent containing an alcohol having 1 to 5 carbon atoms by 10% by mass or more, and polymerization reaction is performed so that 0 to 100% by mass in 100% by mass of N-vinylpyrrolidone and 0 to 10% by mass in 100% by mass of hydroxyl group-containing (meth)acrylate are initially charged into the above-mentioned reaction vessel and the residuals of N-vinylpyrrolidone and hydroxyl group-containing (meth)acrylate are successively added into the reaction vessel.

"Initially charging" in the present invention means a raw material when the polymerization initiator amount existing in the polymerization reaction system is 0 to 0.01% by mass with respect to 100% by mass of the polymerization initiator used for the polymerization reaction.

A reaction vessel usable in the present invention is not particularly limited if it is made of metal, and examples thereof include vessels made of stainless steel (such as SUS304, SUS316, SUS403 and SUS430).

The above-mentioned nitrogen-containing basic compound is used for decreasing the metal content in the vinylpyrrolidone-based copolymer according to the present invention. The use of the nitrogen-containing basic compound brings a tendency to restrain highly corrosive formic acid from being produced; as a result, it is considered that metal elution from a metallic reaction vessel is restrained. The used amount of the above-mentioned nitrogen-containing basic compound is preferably 0.0001 to 0.5% by mass, more preferably 0.0005 to 0.3% by mass and far more preferably 0.001 to 0.2% by mass with respect to a monomer component. In the case of that the amount of the nitrogen-containing basic compound is too small, it is difficult to decrease the metal content in the produced pyrrolidone copolymer sufficiently, on the other hand, in the case of that the amount thereof is too large, it may causes a problem in which coloring becomes excessive and electrical conductivity is raised.

Examples of the above-mentioned nitrogen-containing basic compound include ammonia; alkylamines such as monomethylamine, dimethylamine, trimethylamine, monoethylamine, diethylamine and triethylamine; alkanolamines such as monoethanolamine, diethanolamine, triethanolamine, monoisopropanolamine and dimethylethanolamine; pyridine and derivatives thereof; piperazine and derivatives thereof, imidazole and derivatives thereof; morpholine and derivatives thereof; aniline and derivatives thereof; and guanidine salts such as guanidine carbonate.

Among these nitrogen-containing basic compounds, it is preferable that the nitrogen-containing basic compound having high water-solubility and base dissociation constant (pKb) at 25° C. in the aqueous solution of 3.5 or more. The base dissociation constant (pKb) is more preferably 4.0 or more, far more preferably 4.2 or more and most preferably 4.4 or more. The case of using a nitrogen-containing basic compound having a pKb of less than 3.5 brings a possibility of causing defects such that electrical conductivity of the polymer solution becomes too high and hydrolysis of hydroxyl group-containing (meth)acrylate is caused.

Specifically, among the above-mentioned nitrogen-containing basic compounds, ammonia and alkanolamines are preferable, and alkanolamines are more preferable. In the case of using alkanolamines, the used amount thereof is preferably 0.01 to 0.5% by mass, more preferably 0.015 to 0.3% by mass and far more preferably 0.02 to 0.2% by mass with respect to a monomer component.

Alkanolamines usable in the present invention is preferred to have at least one alkanol group, and may be any of primary, secondary and tertiary alkanolamines. In the case where secondary or tertiary alkanolamine has one or two alkanol groups, examples of other substituents bonded to a nitrogen atom include alkyl group and aryl group. In this case, the number of carbon atoms in alkanol group and alkyl group is preferably 1 to 5, more preferably 2 to 3. Specific examples of alkanolamines include monoethanolamine, diethanolamine, methylethanolamine, ethylethanolamine, triethanolamine, dimethylethanolamine, methyldiethanolamine, diethylethanolamine, ethyldimethanolamine, dibutylethanolamine, diethylisopropanolamine, ethyldiisopropanolamine, triethanolamine, triisopropanolamine and N-phenyldiethanolamine. Among these, monoethanolamine, diethanolamine and triethanolamine having a high water-solubility are preferable.

With regard to the above-mentioned nitrogen-containing basic compound, 50% by mass or more of the used amount thereof is preferably added to the reaction system by dropping during polymerization reaction in the same manner as in the following hydroxyl group-containing (meth)acrylate (b). The amount of dropping into the reaction system is more preferably 80% by mass or more, far more preferably the total amount. The nitrogen-containing basic compound is added to the reaction system by dropping, so that the metal content in the produced pyrrolidone copolymer can be decreased further effectively. The case of a small amount of the dropped nitrogen-containing basic compound (that is, a large amount of the nitrogen-containing basic compound initially added to a polymerization vessel) brings a possibility of causing hydrolysis of hydroxyl group-containing (meth)acrylate.

In a process of the present invention, a solvent containing an alcohol having 1 to 5 carbon atoms (occasionally referred to as a "specific solvent" hereinafter) by 10% by mass or more with respect to the total solvent is used as a solvent during polymerization. Thus, a copolymer having small water insoluble matter and a low degree of dispersion is obtained. As described below, in the case where the solvent is successively added together with hydroxyl group-containing (meth) acrylate (b), it is preferred that a specific solvent is within the above-mentioned range with respect to the total solvent at any point of time during the polymerization (in other words, the specific solvent existing in the reaction system at each point of time in all points of time through the polymerization is in the above-mentioned range with respect to the total polymerization solvent existing in the reaction system at that point of time).

Examples of the above-mentioned alcohol having 1 to 5 carbon atoms include methyl alcohol, ethyl alcohol, isopropyl alcohol and 2-methyl-1-propanol. Among these, isopropyl alcohol is preferable in view of being easily controlled in molecular weight and distilled off by distillation after polymerization. The above-mentioned alcohol having 1 to 5 carbon atoms may be of only one kind, or two kinds or more.

It is preferred that the above-mentioned alcohol having 1 to 5 carbon atoms is contained by 10% by mass or more with respect to the total solvent (in other words, 10% by mass or more in the polymerization solvent), preferably 15% by mass or more and more preferably 20% by mass or more.

In the case where the above-mentioned polymerization solvent contains a solvent except the above-mentioned alcohol having 1 to 5 carbon atoms (other solvent), the other solvent is preferably water. That is, examples of a preferable embodiment of the above-mentioned polymerization solvent include a mixed solvent of the above-mentioned alcohol having 1 to 5 carbon atoms and water. Water is contained preferably by 30% by mass or more, more preferably 50% by mass or more. Less than 30% of water in the polymerization solvent brings a tendency to slow down reaction of N-vinylpyrrolidone during the polymerization.

In addition, needless to say, other solvent except water may be contained in the above-mentioned polymerization solvent, in which case it is desired that the content of other solvent except water with respect to the total polymerization solvent be within a range of 10% by mass or less.

Examples of the above-mentioned other solvent except water include alcohol having 6 or more carbon atoms such as 1-heptanol; ethers (acetates) of alkylene glycol such as propylene glycol monomethyl acetate and diethylene glycol monomethyl ether acetate; amides such as dimethylformamide and N-methylpyrrolidone; esters such as ethyl acetate, butyl acetate and γ-butyrolactone; aliphatic hydrocarbons such as hexane and octane; alicyclic saturated hydrocarbons such as cyclohexane; alicyclic unsaturated hydrocarbons such as cyclohexene; aromatic hydrocarbons such as benzene, toluene and xylene; ketones such as acetone and methyl ethyl ketone; halogenated hydrocarbons such as dichloroethane, chloroform and carbon tetrachloride; ethers such as diethyl ether, dioxane and tetrahydrofuran; sulfonate esters such as dimethyl sulfoxide; carbonate esters such as dimethyl carbonate and diethyl carbonate; and alicyclic carbonate esters such as ethylene carbonate and propylene carbonate.

The used amount of the polymerization solvent used in a method of the present invention is not particularly limited and may be properly set in consideration of productivity; for example, the concentration of a monomer component is preferably 10% by mass or more.

Conventionally known polymerization initiators may be used in the method for production of the vinylpyrrolidone-based copolymer of the present invention, but yet a nonionic azo polymerization initiator is used in a method of the present invention in view of polymerization efficiency and decrease in electrical conductivity of the obtained vinylpyrrolidone-based copolymer. Examples of the above-mentioned nonionic azo polymerization initiator include 2,2'-azobis(2,4-dimethylvaleronitrile), 2,2'-azobisisobutyronitrile, 2,2'-azobis(2-methylbutyronitrile), 1,1'-azobis(cyclohexane-1-carbonitrile) and dimethyl-2,2'-azobisisobutyrate. Among these, 2,2'-azobis(2-methylbutyronitrile) and dimethyl-2,2'-azobisisobutyrate are preferable, more preferably dimethyl-2,2'-azobisisobutyrate. The polymerization initiator may be used singly in one kind or in combination of two kinds or more.

The used amount of the above-mentioned polymerization initiator is not particularly limited, preferably 0.05% by mass or more with respect to a monomer component, more preferably 0.1% by mass or more with respect to a monomer component. The used amount of the polymerization initiator of less than 0.05% by mass brings a possibility that the unreacted monomer remains in large quantities.

A chain transfer agent may be used for molecular weight control in the method for production of the vinylpyrrolidone-based copolymer of the present invention. In the case of using a chain transfer agent, it is desired that a nonionic chain transfer agent be used from the viewpoint of decreasing electrical conductivity (the above-mentioned 10%-aqueous solution electrical conductivity) of the vinylpyrrolidone-based copolymer according to the present invention.

Examples of the above-mentioned nonionic chain transfer agent include mercaptoalcohols such as 2-mercaptoethanol and 1,3-mercaptopropanol. The used amount of the chain transfer agent is preferably 0.5% by mass or less, more preferably 0.3% by mass or less and far more preferably 0.1% by mass or less with respect to the above-mentioned monomer component. A larger used amount of the chain transfer agent brings a possibility that odor and coloring become greater.

In the method for production of the vinylpyrrolidone-based copolymer of the present invention, optional co-catalyst, pH regulator and buffering agent can also be used together with the above-mentioned polymerization initiator properly as required.

In the process for production of the vinylpyrrolidone-based copolymer of the present invention, it is preferable to polymerize monomer components containing N-vinylpyrrolidone (a) and hydroxyl group-containing (meth)acrylate (b) at a ratio such that the N-vinylpyrrolidone (a) is 50 to 95% by mass and the hydroxyl group-containing (meth)acrylate (b) is 5 to 50% by mass with respect to the total of both, more preferably the N-vinylpyrrolidone (a) is 60 to 90% by mass and the hydroxyl group-containing (meth)acrylate (b) is 10 to 40% by mass, and far more preferably the N-vinylpyrrolidone (a) is 65 to 85% by mass and the hydroxyl group-containing (meth)acrylate (b) is 15 to 35% by mass. When mutual ratio of N-vinylpyrrolidone (a) and hydroxyl group-containing (meth)acrylate (b) is in the above-mentioned range, a copolymer having small water insoluble matter (in the above-mentioned range) is obtained. When N-vinylpyrrolidone (a) is more than the above-mentioned range (that is, hydroxyl group-containing (meth)acrylate (b) is less than the above-mentioned range), the advantage that reactivity with a crosslinking agent is high in the obtained copolymer, which is derived from hydroxyl group-containing (meth)acrylate, is difficult to be developed; on the contrary, when N-vinylpyrrolidone (a) is less than the above-mentioned range (in other words, hydroxyl group-containing (meth)acrylate (b) is more than the above-mentioned range), gelation is caused so easily that occasionally the obtained copolymer causes a large amount of water insoluble matter and the obtained copolymer may have high degree of dispersion (wide molecular-weight distribution).

The above-mentioned monomer components essentially include N-vinylpyrrolidone (a) and hydroxyl group-containing (meth)acrylate (b), and additionally, the above-mentioned monomer components may include monomers copolymerizable with N-vinylpyrrolidone (other monomers).

Specific examples of the above-mentioned hydroxyl group-containing (meth)acrylate (b) are described above, and examples of preferable monomer components include 2-hydroxyethyl (meth)acrylate. In the case where hydroxyl group-containing (meth)acrylate as the other raw material monomer essential for obtaining the vinylpyrrolidone-based copolymer of the present invention is 2-hydroxyethyl (meth)acrylate, 2-hydroxyethyl acrylate (HEA) is used more preferably than 2-hydroxyethyl methacrylate (HEMA). The reason therefor is that 2-hydroxyethyl acrylate (HEA) is so high in crosslinking reactivity to improve crosslinking reactivity of the vinylpyrrolidone-based copolymer employing this as a raw material monomer. However, on the other hand, 2-hydroxyethyl acrylate (HEA) is further easily subject to crosslinking reaction during polymerization for obtaining the vinylpyrrolidone-based copolymer. Typically, it is difficult to obtain a copolymer having a small amount of water insoluble matter and narrow molecular-weight distribution. However, the above-mentioned method for production of the present invention can overcome a difficulty in the case of employing 2-hydroxyethyl acrylate (HEA) as a raw material monomer.

The above-mentioned other monomers are not particularly limited, and specific examples thereof include 1) (meth)acrylic esters such as methyl (meth)acrylate, ethyl (meth)acrylate, butyl (meth)acrylate, and cyclohexyl (meth)acrylate; 2) (meth)acrylamide derivatives such as (meth)acrylamide, N-monomethyl (meth)acrylamide, N-monoethyl (meth)acrylamide and N,N-dimethyl (meth)acrylamide; 3) basic unsaturated monomers such as dimethylaminoethyl (meth)acrylate, dimethylaminoethyl (meth)acrylamide, vinylpyridine and vinylimidazole; 4) vinylamides such as vinyl formamide, vinyl acetamide and vinyl oxazolidone; 5) carboxyl group-containing unsaturated monomers such as (meth)acrylic acid, itaconic acid, maleic acid and fumaric acid; 6) unsaturated acid anhydrides such as maleic anhydride and itaconic anhydride; 7) vinyl esters such as vinyl propionate and vinyl acetate; 8) vinylethylene carbonate and derivatives thereof, 9) styrene and derivatives thereof, 10) 2-ethyl sulfonate (meth)acrylate and derivatives thereof, 11) vinyl sulfonic acid and derivatives thereof, 12) vinyl ethers such as methyl vinyl ether, ethyl vinyl ether and butyl vinyl ether; 13) olefins such as ethylene, propylene, octene and butadiene. Among these monomers, 1) to 8) are particularly preferable in view of copolymerizability with N-vinylpyrrolidone. The above-mentioned other monomers may be used only in one kind or in combination of two kinds or more. In the case where the above-mentioned monomer components contain the above-mentioned other monomers, the content of other monomers with respect to the total monomer components is preferably less than 20% by mass, more preferably less than 10% by mass.

In the method for production of the vinylpyrrolidone-based copolymer of the present invention, a process for charging polymerization initiator and solvent (specific solvent) is not particularly limited. With regard to N-vinylpyrrolidone (a) among monomer components, the process may be any of a process for collectively adding the total amount at the initial stage, a process for successively adding the residual after adding a part thereof, and a process for successively adding the total amount to the reaction system by dropping. Yet, in order to control copolymerization ratio of N-vinylpyrrolidone (a) and hydroxyl group-containing (meth)acrylate (b), it is preferable to employ a process for successively adding the residual to the polymerization system by dropping after initially adding a part of N-vinylpyrrolidone (a) in the same manner as in the following hydroxyl group-containing (meth)acrylate (b), or a process for successively adding the total amount of N-vinylpyrrolidone (a) to the reaction system by dropping. The adoption of these processes facilitates the control of rate of polymerization of N-vinylpyrrolidone (a) at the end of adding hydroxyl group-containing (meth)acrylate (b) in addition to the control of copolymerization ratio of N-vinylpyrrolidone (a) and hydroxyl group-containing (meth)acrylate (b). The above-mentioned "a part" in the present invention is preferably 30% by mass or less, more preferably 20% by mass or less and far more preferably 10% by mass or less of the amount of N-vinylpyrrolidone (a) to be used.

On the other hand, hydroxyl group-containing (meth)acrylate (b) is preferably successively added in accordance with polymerization velocity of N-vinylpyrrolidone (a) by reason of having higher polymerizability than N-vinylpyrrolidone (a). The simultaneous addition of the total amount of hydroxyl group-containing (meth)acrylate (b) occasionally brings production of water insoluble matter in large quantities, and a possibility of causing a problem in which a copolymerization ratio of N-vinylpyrrolidone (a) and hydroxyl group-containing (meth)acrylate (b) is difficult to be controlled. The ratio of successive addition of the above-mentioned hydroxyl group-containing (meth)acrylate (b) is preferably 90% by mass or more, more preferably 95% by mass or more; the embodiment in which the total amount thereof is successively added to the reaction system to perform polymerization reaction is further preferable.

In the present invention, the above-mentioned "successive addition" may be any of continuous addition (for example, the embodiment of dropping over a certain time), intermittent addition (for example, the embodiment of charging raw materials in a plurality of times) and addition in combination of both.

From the viewpoint of decreasing the production amount of vinylpyrrolidone homopolymer, it is recommended to adopt the embodiment of successively adding both of N-vinylpyrrolidone (a) and hydroxyl group-containing (meth)acrylate (b) to the polymerization reaction system. In particular, it is preferable that hydroxyl group-containing (meth)acrylate (b) is successively added to a reaction solution having an unreacted N-vinylpyrrolidone (a) concentration of 10 ppm or more to give 98% or more of polymerization ratio of N-vinylpyrrolidone at the end of adding hydroxyl group-containing (meth)acrylate (b) (the second method for production of vinylpyrrolidone-based copolymer of the present invention).

Here, the above-mentioned "polymerization ratio of N-vinylpyrrolidone" is consumption ratio of N-vinylpyrrolidone monomer to the total used amount of N-vinylpyrrolidone monomer for the polymerization reaction (the total of initially charged amount and successively added amount). Accordingly, "98% of polymerization ratio" represents that 98 g of N-vinylpyrrolidone monomer is consumed if the total used amount of N-vinylpyrrolidone monomer is 100 g. The consumption ratio of N-vinylpyrrolidone monomer can be measured by analyzing N-vinylpyrrolidone amount in the reaction solution with liquid chromatography in the method described below.

As described above, "successive addition" in the present invention includes the case of continuously dropping and the case of intermittently dropping hydroxyl group-containing (meth)acrylate (b) into the polymerization reaction system. In the case of intermittently dropping, with regard to the timing of dropping hydroxyl group-containing (meth)acrylate (b), the next addition is preferably performed within 1 minute from the previous addition, more preferably 30 seconds or less and far more preferably 10 seconds or less in the initial to latter stage of polymerization (polymerization ratio of N-vinylpyrrolidone is 90% or less). In the latter stage of polymerization (polymerization ratio of N-vinylpyrrolidone is more than 90%), 5 minutes or less is preferable, more preferably 3 minutes or less and far more preferably 1 minute or less. Too long interval of successive addition may increase the production amount of vinylpyrrolidone homopolymer.

The addition of hydroxyl group-containing (meth)acrylate (b) to the polymerization reaction system is preferably started within 10 minutes after starting the addition of a polymerization initiator; more preferably 5 minutes or less, far more preferably 3 minutes or less.

Then, it is preferable that the above-mentioned alkanolamines are successively added in the same manner as in the above-mentioned hydroxyl group-containing (meth)acrylate (b). Needless to say, the above-mentioned polymerization initiator and chain transfer agent may be successively-added into the reaction system.

In the case of performing the second method for production of the vinylpyrrolidone-based copolymer of the present invention, the process may be performed in combination with the above-mentioned first method for production of the vinylpyrrolidone-based copolymer. In this case, the process may be performed while adopting a part or all of the conditions in accordance with the above-mentioned first method.

In the method for production of the vinylpyrrolidone-based copolymers according to the present invention, polymerization temperature (temperature of reaction solution) in performing the polymerization reaction is preferably 50° C. or more, more preferably 60° C. or more. The upper limit of polymerization temperature is not particularly limited and yet it is recommended to set at 100° C. or less.

In the method of the present invention, dissolved oxygen amount in the polymerization solution during the polymerization reaction is preferably 1 mg/L or less. In the case where dissolved oxygen exists in the polymerization system during the polymerization reaction of the vinylpyrrolidone-based copolymers according to the present invention, oxidative decomposition of vinylpyrrolidone is occasionally caused to produce formic acid. The formic acid not merely causes pH decrease in the polymerization system to promote hydrolysis of N-vinylpyrrolidone but also brings a possibility of increasing metal elution from a metallic reaction vessel due to having a great corrosiveness. The formic acid brings a possibility of raising electrical conductivity of aqueous solution of the obtained copolymers due to having an ionicity. Accordingly, the dissolved oxygen amount is more preferably 0.5 mg/L or less, far more preferably 0.3 mg/L or less and most preferably 0.1 mg/L or less.

In the method for production of the vinylpyrrolidone-based copolymers of the present invention, the reaction solution obtained by the polymerization reaction may be subjected to distillation to remove unreacted hydroxyl group-containing (meth)acrylate and components except water (such as alcohol) in a solvent so that obtaining the copolymer in a state of aqueous solution With regard to the vinylpyrrolidone-based copolymers of the present invention, as described above, the K value according to Fikentscher is preferably 12 or more, but yet a higher K value brings a phenomenon such that water insoluble matter is easily increased and molecular-weight distribution is easily widened. However, according to the above-mentioned method for production of the present invention, such a problem is difficult to be caused.

Further, in the method for production of the vinylpyrrolidone-based copolymers of the present invention, the obtained polymerization product is preferably subject to purification treatment with an ion-exchange resin after the polymerization reaction. Such purification treatment allows the content of ionic components, in particular, metals (such as iron, nickel, chromium, sodium and calcium) contained in the copolymers to be decreased. The timing of the treatment is not particularly limited but yet the treatment is preferably performed after the above-mentioned distillation process. Examples of an ion-exchange resin include a strong-acid cation-exchange resin and a mild-acid cation-exchange resin; among these, a strong-acid cation-exchange resin is preferable and porous type is employed more preferably. Usable examples of such an ion-exchange resin include "DIAION (registered trademark) PK216H" and "DIAION (registered trademark) PK228H" (manufactured by Mitsubishi Chemical Corporation). Specifically, either of the following processes can be adopted: a process for charging an ion-exchange resin into a polymer aqueous solution after the polymerization and removing the ion-exchange resin by filtration after stirring, and a process of a column type for passing the polymer aqueous solution through a line filled with the ion-exchange resin.

EXAMPLES

The present invention is hereinafter described more specifically by Examples and is not limited thereto. Unless otherwise specified hereinafter, "part by mass" is denoted simply as "part" and "% by mass" is denoted simply as "%".

In Examples and comparative Examples, water insoluble matter content and degree of dispersion were measured in the following manner.

<Water Insoluble Matter Content>

500 g of a vinylpyrrolidone-based copolymer solution adjusted to a concentration of 10% (polymer solid content of 50 g) was filtered through a sieve in conformance with JIS-Z8801 (nominal size (aperture) of 45 μm, diameter of 75 mm, depth of 20 mm) followed by washing gel remaining on the sieve with 1000 g of ion-exchange water. After drying this sieve at 80° C. for 1 hour, the weight thereof was measured to calculate weight increase (X g) before and after filtering and calculate water insoluble matter content on the basis of the following expression:

Water insoluble matter content (%)=[weight increase ($X$ g)/polymer solid content (50 g)]×100.

<Degree of Dispersion>

The obtained vinylpyrrolidone-based copolymer solution was analyzed by gel permeation chromatography (GPC) on the following conditions to measure weight-average molecular weight (Mw) and number-average molecular weight (Mn) in terms of polystyrene and calculate degree of dispersion in accordance with (Mw)/(Mn).

Column: "Shodex KD-G", "Shodex LF804", "Shodex KD801" manufactured by Showa Denko K.K.

Eluant: 0.1% lithium bromide-containing dimethylformamide solution

Eluant flow rate: 0.8 mL/minute

Injection amount: 10 μL

Column oven: 40° C.

Detector: differential refractometer (RI)

Sample concentration: 0.5%

<K Value>

A K value is a value such that the vinylpyrrolidone-based copolymer obtained in the following Experimental Examples is dissolved in ion-exchange water up to a concentration of 1% by mass and then viscosity of the solution is measured by a capillary viscometer at 25° C. to calculate from the obtained values by the following Fikentscher equation:

$$(\log \eta_{rel})/C = [(75 K_0^2)/(1+1.5 K_0 C)] + K_0$$

In the equation, C denotes g number of the vinylpyrrolidone-based copolymer in the 100 mL-solution, $\eta_{rel}$ denotes viscosity (relative viscosity, viscosity of the vinylpyrrolidone copolymer solution to ion-exchange water) of the measured vinylpyrrolidone solution and $K_0$ denotes a parameter related to K value.

<Metal Content>

Metal content was measured by ICP-MS (inductively coupled plasma mass spectrometer "SPQ-9500", manufactured by SII NanoTechnology Inc.) after the vinylpyrrolidone-based copolymer solution obtained in the following Experimental Examples was subject to ashing treatment and dissolved in nitric acid.

<10%-Aqueous Solution Electrical Conductivity>

The vinylpyrrolidone-based copolymer solution obtained in the following Experimental Examples was made into a 10%-aqueous solution by using ultrapure water to measure electrical conductivity thereof by a conductivity meter (conductivity meter "ES-51" (used electrode: 3551-10D), manufactured by HORIBA, Ltd.).

On the occasion of measurement, a vessel made of polypropylene with a capacity of 100 ml sufficiently washed with ultrapure water was used and the vinylpyrrolidone-based copolymer solution was weighed by 20 to 30 g to prepare the aqueous solution by adding and sufficiently stirring ultrapure water thereto so as to have a solid content of 10% by mass. Subsequently, the electrical conductivity was measured after the solution temperature was set at 20 to 25° C. and the electrode of the above-mentioned conductivity meter was immersed in the copolymer solution in the vessel to stand still for meter was immersed in the copolymer solution in the vessel to stand still for 30 seconds.

The ultrapure water used at this time was prepared by "Direct-Q", manufactured by MILLIPORE.

<30%-Aqueous Solution Hazen Color Number>

A 30%-aqueous solution of the vinylpyrrolidone-based copolymer obtained in the following Experimental Examples was prepared by using ultrapure water, taken in a color comparison tube (inside diameter of 20 mm, a flat-bottomed glass tube with a stopper), and subject to colorimetry with a previously prepared Hazen standard solution to measure color number (Hazen) in conformance with JIS-K3331. Lower numerical value thereof denotes lower coloring.

2.65 g of hexachloroplatinic(IV) acid hexahydrate and 2.00 g of cobalt(II) chloride hexahydrate were each weighed and 200 ml of hydrochloric acid was added thereto and dissolved, to thereafter add water and prepare into 2000 ml, which was used as a Hazen 500 standard solution.

<Formic Acid Amount>

Formic acid amount was measured by using ion chromatography manufactured by Nihon Dionex Corporation on the following conditions.

Separation column: IonPac AS15 (guard column; IonPac AG15) manufactured by Nihon Dionex Corporation Eluant: KOH solution Flow rate: 1.6 mL/minute Injection amount: 50 μL Column temperature: 35° C.

Detector: conductometric detection

Detector temperature: 35° C.

<Vinylpyrrolidone Homopolymer Content>

A polymer aqueous solution corresponding to 3.0 g of polymer solid content, 34 g of ion-exchange water and 6 g of a 5N-sodium hydroxide aqueous solution were added to a vessel made of glass with a capacity of 100 ml to obtain an uniform solution, which was tightly stoppered and thereafter heated in a constant temperature bath of 80° C. for 7 hours (to hydrolyze hydroxyl group-containing (meth)acrylate portion).

Subsequently, the total amount of the obtained solution was put and tightly stoppered in a dialysis membrane (manufactured by SPECTRUM LABORATORIES INC., Spectra/Por Membrane MWCO: 1000, molecular weight cut off: 1000) of 50 cm (length), and then immersed in 5000 g of ion-exchange water put in a beaker with a capacity of 5 L to stand still. After 12 hours passed, the ion-exchange water in the beaker was changed and immersion was performed for another 12 hours. After this process was repeated twice, the dialysis membrane was taken out of the beaker to sufficiently wash away the outside of the dialysis membrane with the ion-exchange water and thereafter take out the solution in the dialysis membrane, which was dried by a hot-air dryer of 120° C. for 1 hour, solidified and thereafter crushed to obtain a pulverulent body (polymer pulverulent body in which hydroxyl group-containing (meth)acrylate portion was hydrolyzed, insoluble in dimethylformamide (DMF)).

3 g of ion-exchange water was added to 1 g of the obtained pulverulent body and dissolved, and thereafter 46 g of a 0.1%-lithium bromide-containing dimethylformamide solution was added thereto and sufficiently stirred (white precipitation was produced, and PVP contained in the pulverulent body was dissolved in supernatant liquid by reason of being soluble in DMF). The supernatant liquid was filtered through a filter of 0.45 μm and thereafter analyzed by gel permeation chromatography (GPC) (the same measurement conditions as degree of dispersion were adopted) to measure PVP amount from peak area and calculate from the following formula. A calibration curve previously made by polyvinylpyrrolidone K30 (manufactured by NIPPON SHOKUBAI CO., LTD.) was used for measuring PVP amount.

$$PVP \text{ content (\% by mass)} = (PVP \text{ amount in supernatant liquid (\% by mass)}/2) \times 100$$

<N-vinylpyrrolidone and 2-pyrrolidone Amount Measuring Method>

N-vinylpyrrolidone and 2-pyrrolidone amount were measured by liquid chromatography (NANOSPACE SI-2, manufactured by Shiseido Company, Limited) on the following conditions.

Separation column: CAPCELL PAC C18 TYPE UG120 5 μm 1.5 mm×250 mm, manufactured by Shiseido Company, Limited Eluant: methanol/water=1/24 (containing sodium 1-heptanesulfonate by 0.4%)
Flow rate: 100 μL/min
Injection amount: 10 μL
Column temperature: 20° C.
Detector: UV (wavelength: 214 nm)

Experimental Example 1

28.2 parts of ion-exchange water, 12.1 parts of isopropyl alcohol (IPA) and 1 part of N-vinylpyrrolidone (NVP) were charged into a polymerization vessel made of SUS304 equipped with a condenser, a nitrogen introduction line and a thermometer and nitrogen was introduced therein while stirred and make dissolved oxygen in the mixed solution into 0.2 mg/L. The polymerization vessel was heated in an oil bath until internal temperature thereof became 80° C. (polymerization temperature), and thereafter a monomer solution (A1) in which 18.2 parts of NVP, 0.036 part of triethanolamine (TEA) and 10.2 parts of ion-exchange water were mixed, a initiator solution (I1-1) in which 0.36 part of dimethyl-2,2'-azobisisobutyrate ("V601", manufactured by Wako Pure Chemical Industries, Ltd.) was dissolved in 3.2 parts of IPA, and 4.7 parts of 2-hydroxyethyl acrylate (HEA) (monomer (B1)) were added thereto by successively-dropping. The monomer solution (A1) and the initiator solution (I1-1) were each dropped over 2 hours, and the monomer solution (B1) was dropped over 2 hours and 15 minutes.

Subsequently, a monomer solution (B1-2) in which 0.14 part of 2-hydroxyethyl acrylate was dissolved in 1.2 parts of IPA was added thereto over 45 minutes. Thereafter, jacket was heated up to 120° C. to start distillation. The distillation was performed for 5 hours while 29.2 parts of ion-exchange water and an initiator solution (I1-2) in which 0.07 part of V601 was dissolved in 0.6 part of IPA were each charged into the polymerization vessel in three times until a distillate amount became 29.2 parts, to obtain a polymer solution (solution of NVP/HEA copolymer, colorless and transparent, solid content of 30.2%). The physical properties of the obtained polymer solution are shown in Table 1.

With regard to NVP/HEA copolymer in the obtained solution, the K value was 28.6, the water insoluble matter content was 0%, the weight-average molecular weight was 62,346, the number-average molecular weight was 37,761 and the degree of dispersion was 1.65.

Experimental Example 2

A polymer solution was obtained in the same manner as in Experimental Example 1 except for replacing the initiator solution (I1-1) with an initiator solution (I2) in which 0.24 part of V601 was dissolved in 2.2 parts of IPA in Experimental Example 1 (solution of NVP/HEA copolymer, colorless and transparent, solid content of 30.5%). The physical properties of the obtained polymer solution are shown in Table 1.

With regard to NVP/HEA copolymer in the obtained solution, the K value was 33.4, the water insoluble matter content was 0.01%, the weight-average molecular weight was 86,346, the number-average molecular weight was 48,629 and the degree of dispersion was 1.78.

Experimental Example 3

A polymer solution was obtained in the same manner as in Experimental Example 1 except for performing polymerization while setting temperature in the polymerization vessel at 85° C. in Experimental Example 1 (solution of NVP/HEA copolymer, colorless and transparent, solid content of 32.5%). The physical properties of the obtained polymer solution are shown in Table 1.

With regard to NVP/HEA copolymer in the obtained solution, the K value was 26.5, the water insoluble matter content was 0%, the weight-average molecular weight was 53,543, the number-average molecular weight was 33,138 and the degree of dispersion was 1.62.

Experimental Example 4

A polymer solution was obtained in the same manner as in Experimental Example 1 except for employing a polymerization vessel made of SUS316 as the polymerization vessel (solution of NVP/HEA copolymer, colorless and transparent, solid content of 32.4%). The physical properties of the obtained polymer solution are shown in Table 1.

With regard to NVP/HEA copolymer in the obtained solution, the K value was 29.3, the water insoluble matter content was 0%, the weight-average molecular weight was 65,784, the number-average molecular weight was 39,114 and the degree of dispersion was 1.68.

Experimental Example 5

A polymer solution was obtained in the same manner as in Experimental Example 2 except for replacing isopropyl alcohol (IPA) with ethanol as the solvent (solution of NVP/HEA copolymer, colorless and transparent, solid content of 31.2%). The physical properties of the obtained polymer solution are shown in Table 1.

With regard to NVP/HEA copolymer in the obtained solution, the K value was 41.6, the water insoluble matter content was 0.02%, the weight-average molecular weight was 136,955, the number-average molecular weight was 76,930 and the degree of dispersion was 1.78.

Experimental Example 6

A polymer solution was obtained in the same manner as in Experimental Example 2 except for using a monomer solution (A6) in which 0.06 part of 2-mercaptoethanol was added to the monomer solution (A1) used in Experimental Example 1 (solution of NVP/HEA copolymer, colorless and transparent, solid content of 30.6%). The physical properties of the obtained polymer solution are shown in Table 1.

With regard to NVP/HEA copolymer in the obtained solution, the K value was 22.2, the water insoluble matter content was 0%, the weight-average molecular weight was 36,811, the number-average molecular weight was 24,306 and the degree of dispersion was 1.51.

Experimental Example 7

A polymer solution was obtained in the same manner as in Experimental Example 2 except for replacing isopropyl alcohol with ethanol as the solvent and using a monomer solution (A7) containing 0.06 part of 2-mercaptoethanol instead of TEA in the monomer solution (A1) used in Experimental Example 1 (solution of NVP/HEA copolymer, colorless and transparent, solid content of 31.9%). The physical properties of the obtained polymer solution are shown in Table 1.

With regard to NVP/HEA copolymer in the obtained solution, the K value was 28.6, the water insoluble matter content was 0%, the weight-average molecular weight was 59,006, the number-average molecular weight was 36,041 and the degree of dispersion was 1.64.

Experimental Example 8

A polymer solution was obtained in the same manner as in Experimental Example 7 except for using a polymerization vessel made of SUS316 as the polymerization vessel and replacing ethanol with isopropyl alcohol as the solvent (solution of NVP/HEA copolymer, colorless and transparent, solid content of 30.3%). The physical properties of the obtained polymer solution are shown in Table 1.

With regard to NVP/HEA copolymer in the obtained solution, the K value was 21.6, the water insoluble matter content was 0.01%, the weight-average molecular weight was 35,010, the number-average molecular weight was 22,877 and the degree of dispersion was 1.53.

Experimental Example 9

A polymer solution was obtained in the same manner as in Experimental Example 1 except for not using TEA (solution of NVP/HEA copolymer, colorless and transparent, solid content of 30.6%). The physical properties of the obtained polymer solution are shown in Table 1.

With regard to NVP/HEA copolymer in the obtained solution, the K value was 28.6, the water insoluble matter content was 0%, the weight-average molecular weight was 61,503, the number-average molecular weight was 37,124 and the degree of dispersion was 1.66.

Experimental Example 10

20 parts of ion-exchange water was charged into a polymerization vessel made of SUS304 equipped with a condenser, a nitrogen introduction line and a thermometer and nitrogen was introduced therein while stirred to render the inside of the polymerization vessel to nitrogen atmosphere. The polymerization vessel was heated in an oil bath until internal temperature thereof became 95° C., and thereafter a monomer solution (AB10) in which 16.8 parts of N-vinylpyrrolidone (NVP), 4.2 parts of 2-hydroxyethyl acrylate (HEA) and 16.4 parts of ion-exchange water were mixed, and an initiator solution (I10) in which 0.75 part of 4,4'-azobis-4-cyanovaleric acid (NC25: manufactured by NIPPOH CHEMICALS CO., LTD.), 0.76 part of triethanolamine (TEA) and 11.1 parts of ion-exchange water were mixed and dissolved were successively-dropped thereinto over 2 hours each. Thereafter, stirring while heated was continued for another 2 hours to obtain a polymer solution (solution of NVP/HEA copolymer, colorless and transparent, solid content of 33.3%). The physical properties of the obtained polymer solution are shown in Table 1.

With regard to NVP/HEA copolymer in the obtained solution, the K value was 29.7, the water insoluble matter content was 0.57%, the weight-average molecular weight was 75,337, the number-average molecular weight was 38,422 and the degree of dispersion was 1.96.

Experimental Example 11

50 parts of ion-exchange water was charged into a polymerization vessel made of SUS304 equipped with a condenser, a nitrogen introduction line and a thermometer and nitrogen was introduced while stirred to render the inside of the polymerization vessel to nitrogen atmosphere. The polymerization vessel was heated in an oil bath until internal temperature thereof became 90° C., and thereafter a monomer solution (AB11) in which 33.6 parts of N-vinylpyrrolidone, 7.9 parts of 2-hydroxyethyl acrylate and 27.9 parts of ion-exchange water were mixed, and an initiator solution (I11) in which 2.1 parts of dimethyl-2,2'-azobisisobutyrate ("V601", manufactured by Wako Pure Chemical Industries, Ltd.), 4.0 parts of isopropyl alcohol and 4.4 parts of ion-exchange water were mixed and dissolved were successively-dropped thereinto over 1 hour each.

Subsequently, a monomer solution (B11) in which 0.5 part of 2-hydroxyethyl acrylate was dissolved in 9.6 parts of ion-exchange water was added thereto over 15 minutes. Thereafter, stirring while heated was further continued for 45 minutes to obtain a polymer solution (solution of NVP/HEA copolymer, colorless and transparent, solid content of 31.0%). The physical properties of the obtained polymer solution are shown in Table 1.

With regard to NVP/HEA copolymer in the obtained solution, the K value was 31.9, the water insoluble matter content was 0.64%, the weight-average molecular weight was 80,801, the number-average molecular weight was 38,423 and the degree of dispersion was 2.10.

Experimental Example 12

50 parts of ion-exchange water was charged into a polymerization vessel made of SUS304 equipped with a condenser, a nitrogen introduction line and a thermometer and nitrogen was introduced therein while stirred to render the inside of the polymerization vessel to nitrogen atmosphere. Subsequently, the polymerization vessel was heated in an oil bath until internal temperature thereof became 90° C., and thereafter a monomer solution (AB12) in which 33.6 parts of N-vinylpyrrolidone (NVP), 7.9 parts of 2-hydroxyethyl acrylate (HEA) and 32.1 parts of ion-exchange water were mixed, and an initiator solution (I12-1) in which 1.26 parts of dimethyl-2,2'-azobisisobutyrate ("V601", manufactured by Wako Pure Chemical Industries, Ltd.), 2.4 parts of isopropyl alcohol and 2.6 parts of ion-exchange water were mixed and dissolved were successively-dropped thereinto over 1 hour each.

Subsequently, a monomer solution (B12) in which 0.5 part of 2-hydroxyethyl acrylate (HEA) was dissolved in 9.6 parts of ion-exchange water was added thereto over 15 minutes. Thereafter, while stirring and heating was further continued for 105 minutes, an initiator solution (I12-2) in which 0.06 part of dimethyl-2,2'-azobisisobutyrate ("V601", manufactured by Wako Pure Chemical Industries, Ltd.) was dissolved in 0.13 part of ion-exchange water and 0.12 part of isopropyl alcohol were added thereinto in three times to obtain a solution of NVP/HEA copolymer (solution of NVP/HEA copolymer, colorless and transparent, solid content of 31.0%). The physical properties of the obtained polymer solution are shown in Table 1.

With regard to NVP/HEA copolymer in the obtained solution, the K value was 37.3, the water insoluble matter content was 1.03%, the weight-average molecular weight was 115,184, the number-average molecular weight was 55,671 and the degree of dispersion was 2.07.

Experimental Example 13

28.2 parts of ultrapure water, 12.1 parts of isopropyl alcohol ("IPA-SE", manufactured by Tokuyama Corporation: hereinafter abbreviated as IPA) and 1 part of N-vinylpyrrolidone (manufactured by NIPPON SHOKUBAI CO., LTD., NVP) were changed into a polymerization vessel made of SUS316 equipped with a condenser, a nitrogen introduction line and a thermometer and nitrogen was introduced therein while stirred to render dissolved oxygen in the mixed solution to 0.2 mg/L. The polymerization vessel was heated in an oil bath until internal temperature thereof became 80° C., and thereafter a monomer solution (AB13) in which 18.2 parts of NVP, 0.036 part of triethanolamine ("TEA-S", manufactured by NIPPON SHOKUBAI CO., LTD.), 9.7 parts of ultrapure water and 4.1 parts of 2-hydroxyethyl acrylate (HEA, manufactured by NIPPON SHOKUBAI CO., LTD.) were mixed, and an initiator solution (I13) in which 0.36 part of dimethyl-2,2'-azobisisobutyrate ("V601", manufactured by Wako Pure Chemical Industries, Ltd.) was mixed and dissolved in 3.1 parts of IPA were added thereto over 2 hours each. The unreacted N-vinylpyrrolidone concentration in a reaction solution before adding the monomer solution (AB13) was 24210 ppm.

Subsequently, after dropping 0.52 part of 2-hydroxyethyl acrylate over 15 minutes, a solution in which 0.14 part of 2-hydroxyethyl acrylate was dissolved in 1.1 parts of IPA was further added thereto over 45 minutes. Thereafter, jacket was gently heated up so that foaming of a polymerization solution did not become vigorous to start distillation and an initiator solution (I13-2) in which 0.05 part of V601 was dissolved in 0.43 part of IPA was charged in six times until internal temperature became 98° C. and distillate amount became 27.6 parts over 5 hours. Thereafter, 28.3 parts of ultrapure water was added and the reaction solution was cooled to obtain a polymer solution (solution of NVP/HEA copolymer, color: colorless and transparent, solid content of 0%). The physical properties of the obtained a polymer solution are shown in Table 2 (weight-average molecular weight: 65,844, number-average molecular weight: 39,684).

The ultrapure water used in the Experimental Example 13 and the following Experimental Examples was prepared by "Direct-Q", manufactured by MILLIPORE.

The dissolved oxygen concentration was measured by stopping stirring the above-mentioned mixed solution to thereafter immerse a sensor of a dissolved oxygen meter ("UC-12-SOL type", manufactured by Central Kagaku Corp.) directly in the mixed solution.

Experimental Example 14

36.6 parts of ultrapure water, 15.7 parts of isopropyl alcohol (IPA) and 1.2 parts of N-vinylpyrrolidone (NVP) were charged into a polymerization vessel made of SUS304 equipped with a condenser, a nitrogen introduction line and a thermometer and nitrogen was introduced therein while to render dissolved oxygen in the mixed solution to 0.2 mg/L. The polymerization vessel was heated in an oil bath until internal temperature thereof became 80° C., and thereafter a monomer solution (A14) in which 22.8 parts of NVP, 0.015 part of triethanolamine (TEA) and 13.0 parts of ion-exchange water were mixed, and an initiator solution (I14) in which 0.45 part of dimethyl-2,2'-azobisisobutyrate ("V601", manufactured by Wako Pure Chemical Industries, Ltd.) was dissolved in 4.1 parts of IPA were successively-dropped thereinto over 2 hours, and then a monomer solution (B14) in which 5.82 parts of 2-hydroxyethyl acrylate (HEA) and 1.5 parts of IPA were mixed was successively-dropped thereinto over 2 hours and 15 minutes. The unreacted N-vinylpyrrolidone concentration in reaction solution before adding the monomer solution (B14) was 22430 ppm.

Subsequently, a monomer solution (B14-2) in which 0.18 part of 2-hydroxyethyl acrylate and 0.05 part of IPA were mixed was added thereto over 45 minutes. Thereafter, jacket was gently heated up so that foaming of a polymerization solution did not become vigorous to start distillation and continue stirring and heating until internal temperature reached 100° C. and distillate amount became 35 parts over 2 hours and 30 minutes. Thereafter, 37 parts of ultrapure water was charged and the reaction solution was cooled to obtain a polymer solution (solution of NVP/HEA copolymer, color: colorless and transparent, solid content of 29.8%). The physical properties of the obtained polymer solution are shown in Table 2 (weight-average molecular weight: 65,957, number-average molecular weight: 39,639).

Experimental Example 15

A polymer solution was obtained in the same manner as in Experimental Example 14 except for replacing 0.015 part of triethanolamine with 0.006 part of monoethanolamine in Experimental Example 14 (solution of NVP/HEA copolymer, colorless and transparent, solid content of 29.9%). The physical properties of the obtained polymer solution are shown in Table 2 (weight-average molecular weight: 65,692, number-average molecular weight: 39,364).

Experimental Example 16

A polymer solution was obtained in the same manner as in Experimental Example 14 except for replacing 0.015 part of triethanolamine with 0.012 part of a 25%-ammonia aqueous solution in Experimental Example 14 (solution of NVP/HEA copolymer, colorless and transparent, solid content of 30.1%). The physical properties of the obtained polymer solution are shown in Table 2 (weight-average molecular weight: 65,789, number-average molecular weight: 39,647).

Experimental Example 17

A polymer solution was obtained in the same manner as in Experimental Example 14 except for replacing triethanolamine with triethylamine in Experimental Example 14 (solution of NVP/HEA copolymer, colorless and transparent, solid content of 30.0%). The physical properties of the obtained polymer solution are shown in Table 2 (weight-average molecular weight: 66,031, number-average molecular weight: 39,231).

Experimental Example 18

190 parts of ion-exchange water, 58 parts of N-vinylpyrrolidone and 15 parts of 2-hydroxyethyl acrylate were charged into a polymerization vessel made of SUS316 equipped with a condenser, a nitrogen introduction line and a thermometer and nitrogen was introduced therein while stirred to render dissolved oxygen in the mixed solution to 0.2 mg/L. The polymerization vessel was heated in a water bath until internal temperature thereof reached 70° C., and thereafter an initiator solution (I18) in which 0.8 part of potassium persulfate was mixed and dissolved in 10 parts of ion-exchange water was added, and after confirming heat generation by heat of polymerization, stirring and heating was continued for 4 hours to obtain a polymer solution (solution of NVP/HEA copolymer, pale yellow and transparent, solid content of 33.1%). The physical properties of the obtained polymer solution are shown in Table 2 (weight-average molecular weight: 130,977, number-average molecular weight: 54,747).

Experimental Example 19

41 parts of ion-exchange water, 19 parts of IPA, 11 parts of NVP and 0.05 part of di-tert-butyl peroxide were added to an autoclave made of SUS316 and nitrogen was introduced and heat to 130° C. Subsequently, a monomer solution in which 120 parts of ion-exchange water, 73 parts of NVP and 36 parts of HEA were mixed and dissolved, and an initiator solution in which 0.4 part of di-tert-butyl peroxide was dissolved in 17 parts of IPA were successively-added thereto over 3 hours each. Stirring and heating was further continued for 2 hours at 130° C. and thereafter the solution was cooled. This solution was transferred to the polymerization vessel made of SUS316 and heated again in an oil bath to start distillation, which was continued until internal temperature reached 98° C. and distillate amount became 35 parts over 4 hours. Thereafter, 135 parts of ultrapure water was charged and the solution was cooled to obtain a polymer solution. The physical properties of the obtained polymer solution are shown in Table 2 (weight-average molecular weight: 67,841, number-average molecular weight: 34,703).

Experimental Example 20

A polymer solution was obtained in the same manner as in Experimental Example 14 except for replacing 0.015 part of triethanolamine with 0.009 part of diethanolamine in Experimental Example 14 (solution of NVP/HEA copolymer, colorless and transparent, solid content of 30.4%). The physical properties of the obtained polymer solution are shown in Table 2 (weight-average molecular weight: 65,988, number-average molecular weight: 40,231).

Experimental Example 21

28.2 parts of ultrapure water, 13.2 parts of isopropyl alcohol ("IPA-SE", manufactured by Tokuyama Corporation) and 1 part of N-vinylpyrrolidone (manufactured by NIPPON SHOKUBAI CO., LTD.) were charged into a polymerization vessel made of SUS316 equipped with a condenser, a nitrogen introduction line and a thermometer and nitrogen was introduced therein while stirred to render dissolved oxygen in the mixed solution to 0.2 mg/L. The polymerization vessel was heated in an oil bath until internal temperature thereof reached 80° C. At this time, the unreacted NVP concentration in a reaction solution was 23580 ppm. Subsequently, a monomer solution (AB20) in which 18.2 parts of NVP, 0.036 part of triethanolamine ("TEA-S", manufactured by NIPPON SHOKUBAI CO., LTD.), 9.7 parts of ultrapure water and 4.8 parts of 2-hydroxyethyl acrylate (HEA, manufactured by NIPPON SHOKUBAI CO., LTD.) were mixed, and an initiator solution (I20) in which 0.36 part of dimethyl-2,2'-azobisisobutyrate ("V601H", manufactured by Wako Pure Chemical Industries, Ltd.) was dissolved in 3.1 parts of IPA were successively-dropped thereinto over 2 hours.

Subsequently, the reaction solution was gently heated up to 85° C. to start distillation, which was performed until internal temperature reached 98° C. and distillate amount became 27.5 parts over 3 hours, and thereafter 28 parts of ultrapure water was charged and the solution was cooled to obtain a polymer solution (solution of NVP/HEA copolymer, color: colorless and transparent, solid content of 30.2%). The physical properties of the obtained polymer solution are shown in Table 2 (weight-average molecular weight: 65,042, number-average molecular weight: 38,205).

Experimental Example 22

34.7 parts of ultrapure water, 14.9 parts of isopropyl alcohol (IPA) and 1.1 parts of N-vinylpyrrolidone (NVP) were charged into a polymerization vessel made of SUS304 equipped with a condenser, a nitrogen introduction line and a thermometer and nitrogen was introduced thereto while stirred to render dissolved oxygen in the mixed solution to 0.2 mg/L. The polymerization vessel was heated in an oil bath until internal temperature thereof became 80° C., and thereafter a monomer solution (A22) in which 20.0 parts of NVP, 0.015 part of triethanolamine (TEA) and 14.7 parts of ion-exchange water were mixed, and an initiator solution (I22) in which 0.45 part of dimethyl-2,2'-azobisisobutyrate ("V601", manufactured by Wako Pure Chemical Industries, Ltd.) was dissolved in 4.1 parts of IPA were successively-dropped over 2 hours, and then a monomer solution (B22) in which 8.73 parts of 2-hydroxyethyl methacrylate (HEMA, manufactured by NIPPON SHOKUBAI CO., LTD.) and 2.2 parts of IPA were mixed was successively-dropped over 2 hours and 15 minutes. The unreacted N-vinylpyrrolidone concentration in a reaction solution before adding the monomer solution (B22) was 21690 ppm.

Subsequently, a monomer solution (B22-2) in which 0.27 part of 2-hydroxyethyl methacrylate and 0.07 part of IPA were mixed was added thereto over 45 minutes. Thereafter, jacket was gently heated up so that foaming of a polymerization solution did not become vigorous to start distillation and continue stirring and heating until internal temperature reached 99° C. and distillate amount got to 35 parts over 3 hours. Thereafter, a polymer solution was obtained by adding 37 parts of ultrapure water thereto followed by cooling (solution of NVP/HEMA copolymer, color: colorless and transparent, solid content of 30.1%). The physical properties of the obtained polymer solution are shown in Table 2 (weight-average molecular weight: 67,360, number-average molecular weight: 39,890).

Experimental Example 23

50 g of a cation-exchange resin ("DIAION (registered trademark) PK216H", manufactured by Mitsubishi Chemical Corporation) was filled into a column made of glass with a diameter of 2 cm, and washed with ion-exchange water, thereafter, 100 g of the polymer aqueous solution obtained in Experimental Example 9 was fed therethrough at 25° C. over 30 minutes. The metal content of the obtained polymer solution is shown in Table 3.

TABLE 1

| Synthetic Example | | | Experimental Example 1 | Experimental Example 2 | Experimental Example 3 | Experimental Example 4 | Experimental Example 5 | Experimental Example 6 |
|---|---|---|---|---|---|---|---|---|
| Composition/ polymerization conditions | VP/HEA (mass ratio) | | 80/20 | 80/20 | 80/20 | 80/20 | 80/20 | 80/20 |
| | Vessel material | | SUS304 | SUS304 | SUS304 | SUS316 | SUS304 | SUS304 |
| | Solvent | | Water/IPA | Water/IPA | Water/IPA | Water/IPA | Water/EtOH | Water/IPA |
| | Nitrogen-containing basic | Kind (% by mass) | TEA 0.15 | TEA 0.15 | TEA 0.15 | TEA 0.15 | TEA 0.15 | TEA 0.15 |

TABLE 1-continued

| | | | Experimental Example 1 | Experimental Example 2 | Experimental Example 3 | Experimental Example 4 | Experimental Example 5 | Experimental Example 6 |
|---|---|---|---|---|---|---|---|---|
| | | compound | | | | | | |
| | Initiator | Kind | V601 1.5 | V601 1.0 | V601 1.5 | V601 1.5 | V601 1.0 | V601 1.0 |
| | | (% by mass) | | | | | | |
| | MCE (% by mass) | | — | — | — | — | — | 0.25 |
| | Polymerization temperature (° C.) | | 80 | 80 | 85 | 80 | 80 | 80 |
| Copolymer properties | K value | | 28.6 | 33.4 | 26.5 | 29.3 | 41.6 | 22.2 |
| | Water insoluble matter content (%) | | 0 | 0.01 | 0 | 0 | 0.02 | 0 |
| | Degree of dispersion | | 1.65 | 1.78 | 1.62 | 1.68 | 1.78 | 1.51 |
| | Metal content | Fe (ppb) | <30 | <30 | <30 | <30 | <30 | <30 |
| | | Ni (ppb) | <30 | <30 | <30 | <30 | <30 | <30 |
| | | Cr (ppb) | <30 | <30 | <30 | <30 | <30 | <30 |
| | | Na (ppb) | 42 | 63 | 69 | 49 | 93 | 65 |
| | | Ca (ppb) | 42 | 72 | 53 | 40 | 61 | 93 |
| | 10%-aqueous solution electrical conductivity (μS/cm) | | 24.7 | 26 | 26.6 | 25.6 | 28.1 | 24.4 |
| | Formic acid (ppm) | | <20 | <20 | <20 | <20 | <20 | <20 |
| | 30%-aqueous solution Hazen color number (APHA) | | 5 | 5 | 5 | 5 | 5 | 50 |
| | PVP homopolymer content (%) | | <0.3 | 0.4 | <0.3 | <0.3 | <0.3 | 0.6 |
| | 2-pyrrolidone (ppm) | | 306 | 313 | 294 | 377 | 462 | 581 |
| | Rate of polymerization of NVP at the end of adding HEA (%) | | 99.6 | 99.5 | 99.7 | 99.6 | 99.6 | 99.2 |

| | Synthetic Example | | Experimental Example 7 | Experimental Example 8 | Experimental Example 9 | Experimental Example 10 | Experimental Example 11 | Experimental Example 12 |
|---|---|---|---|---|---|---|---|---|
| Composition/ polymerization conditions | VP/HEA (mass ratio) | | 80/20 | 80/20 | 80/20 | 80/20 | 80/20 | 80/20 |
| | Vessel material | | SUS304 | SUS316 | SUS304 | SUS304 | SUS304 | SUS304 |
| | Solvent | | Water/EtOH | Water/IPA | Water/IPA | Water | Water | Water |
| | Nitrogen-containing basic compound | Kind (% by mass) | — | — | — | TEA 3.6 | — | — |
| | Initiator | Kind (% by mass) | V601 1.0 | V601 1.0 | V601 1.5 | NC25 3.6 | V601 5.0 | V601 3.0 |
| | MCE (% by mass) | | 0.25 | 0.25 | — | — | — | — |
| | Polymerization temperature (° C.) | | 80 | 80 | 80 | 95 | 90 | 90 |
| Copolymer properties | K value | | 28.6 | 21.6 | 28.6 | 29.7 | 31.9 | 37.3 |
| | Water insoluble matter content (%) | | 0 | 0.01 | 0 | 0.57 | 0.64 | 1.03 |
| | Degree of dispersion | | 1.64 | 1.53 | 1.66 | 1.96 | 2.10 | 2.07 |
| | Metal content | Fe (ppb) | 1323 | 1058 | 1356 | 70 | 1281 | 1429 |
| | | Ni (ppb) | 90 | 61 | 79 | <30 | 95 | 63 |
| | | Cr (ppb) | 64 | 45 | 69 | <30 | 72 | 82 |
| | | Na (ppb) | 61 | 60 | 84 | 92 | 90 | 110 |
| | | Ca (ppb) | 120 | 73 | 88 | 105 | 78 | 69 |
| | 10%-aqueous solution electrical conductivity (μS/cm) | | 47.5 | 39.1 | 43 | 1167 | 66.3 | 67.8 |
| | Formic acid (ppm) | | 106 | 72 | 102 | <20 | 120 | 135 |
| | 30%-aqueous solution Hazen color number (APHA) | | 10 | 10 | 5 | 10 | 20 | 15 |
| | PVP homopolymer content (%) | | 0.4 | <0.3 | <0.3 | 3.3 | <0.3 | <0.3 |
| | 2-pyrrolidone (ppm) | | 7798 | 8531 | 6735 | 10365 | 9912 | 11335 |
| | Rate of polymerization of NVP at the end of adding HEA (%) | | 99.2 | 99.5 | 99.6 | 95.6 | 99.9 | 99.9 |

TABLE 2

| | Synthetic Example | | Experimental Example 13 | Experimental Example 14 | Experimental Example 15 | Experimental Example 16 | Experimental Example 17 |
|---|---|---|---|---|---|---|---|
| Composition/ polymerization conditions | VP/HE(M)A (mass ratio) | | 80/20 | 80/20 | 80/20 | 80/20 | 80/20 |
| | Vessel material | | SUS316 | SUS304 | SUS304 | SUS304 | SUS304 |
| | Solvent | | Water/IPA | Water/IPA | Water/IPA | Water/IPA | Water/IPA |
| | Nitrogen-containing basic compound | Kind (% by mass) | TEA 0.15 | TEA 0.05 | MEA 0.02 | NH$_3$ 0.01 | Triethylamine 0.05 |
| | Initiator | Kind (% by mass) | V601 1.5 | V601 1.5 | V601 1.5 | V601 1.5 | V601 1.5 |
| | MCE (% by mass) | | — | — | — | — | — |
| | Polymerization temperature (° C.) | | 80 | 80 | 80 | 80 | 80 |

TABLE 2-continued

| Copolymer properties | K value | 29.1 | 29.4 | 28.8 | 28.9 | 28.8 |
|---|---|---|---|---|---|---|
| | Water insoluble matter content (%) | 0 | 0 | 0 | 0 | 0.02 |
| | Degree of dispersion | 1.65 | 1.66 | 1.67 | 1.66 | 1.68 |
| | Metal content  Fe (ppb) | <30 | <30 | <30 | <30 | <30 |
| | Ni (ppb) | <30 | <30 | <30 | <30 | <30 |
| | Cr (ppb) | <30 | <30 | <30 | <30 | <30 |
| | Na (ppb) | <30 | <30 | <30 | <30 | <30 |
| | Ca (ppb) | <30 | <30 | <30 | <30 | <30 |
| | 10%-aqueous solution electrical conductivity (μS/cm) | 24.3 | 11.5 | 15.4 | 32.7 | 66.3 |
| | Formic acid (ppm) | <20 | <20 | <20 | <20 | <20 |
| | 30%-aqueous solution Hazen color number (APHA) | 0 | 0 | 0 | 5 | 5 |
| | PVP homopolymer content (%) | <0.3 | <0.3 | <0.3 | <0.3 | <0.3 |
| | 2-pyrrolidone (ppm) | 338 | 592 | 549 | 568 | 644 |
| | Rate of polymerization of NVP at the end of adding HE(M)A (%) | 99.7 | 99.6 | 99.6 | 99.7 | 99.7 |

| | Synthetic Example | Experimental Example 18 | Experimental Example 19 | Experimental Example 20 | Experimental Example 21 | Experimental Example 22 |
|---|---|---|---|---|---|---|
| Composition/ polymerization conditions | VP/HE(M)A (mass ratio) | 80/20 | 70/30 | 80/20 | 80/20 | VP/HEMA = 70/30 |
| | Vessel material | SUS316 | SUS316 | SUS304 | SUS316 | SUS304 |
| | Solvent | Water | Water/IPA | Water/IPA | Water/IPA | Water/IPA |
| | Nitrogen-containing basic compound  Kind (% by mass) | — | — | DEA 0.03 | TEA 0.15 | TEA 0.05 |
| | Initiator  Kind (% by mass) | KPS 0.8 | DTBPO 0.4 | V601 1.5 | V601 1.5 | V601 1.5 |
| | MCE (% by mass) | — | — | — | — | — |
| | Polymerization temperature (° C.) | 70 | 130 | 80 | 80 | 80 |
| Copolymer properties | K value | 22.5 | 29.8 | 28.9 | 28.6 | 29.8 |
| | Water insoluble matter content (%) | 0 | 0 | 0 | 0 | 0 |
| | Degree of dispersion | 2.39 | 1.95 | 1.64 | 1.70 | 1.69 |
| | Metal content  Fe (ppb) | 1871 | 1623 | <30 | <30 | <30 |
| | Ni (ppb) | 134 | 140 | <30 | <30 | <30 |
| | Cr (ppb) | 106 | 74 | <30 | <30 | <30 |
| | Na (ppb) | 128 | <30 | 58 | 41 | 66 |
| | Ca (ppb) | <30 | <30 | <30 | 92 | <30 |
| | 10%-aqueous solution electrical conductivity (μS/cm) | 1073 | 58.5 | 12.0 | 26.2 | 13.5 |
| | Formic acid (ppm) | 208 | 160 | <20 | <20 | <20 |
| | 30%-aqueous solution Hazen color number (APHA) | 140 | 10 | 0 | 5 | 5 |
| | PVP homopolymer content (%) | 9.7 | 3.8 | <0.3 | 6.5 | <0.3 |
| | 2-pyrrolidone (ppm) | 93020 | 12012 | 324 | 801 | 727 |
| | Rate of polymerization of NVP at the end of adding HE(M)A (%) | 0 | 95.7 | 99.6 | 91.8 | 99.8 |

TABLE 3

| | Synthetic Example | Experimental Example 9 | Experimental Example 23 |
|---|---|---|---|
| | Cation-exchange treatment | Not performed | Performed |
| Metal content | Fe (ppb) | 1356 | 54 |
| | Ni (ppb) | 79 | <30 |
| | Cr (ppb) | 69 | <30 |
| | Na (ppb) | 84 | <30 |
| | Ca (ppb) | 88 | <30 |

In Tables 1 and 2, isopropyl alcohol is abbreviated as "IPA", ethanol as "EtOH", triethanolamine as "TEA", 2-mercaptoethanol as "MCE", diethanolamine as "DEA", dimethyl-2,2'-azobisisobutyrate as "V601", potassium persulfate as "KPS" and di-tert-butyl peroxide as "DTBPO. In Tables 1 and 2, any used amount of nitrogen-containing basic compound such as TEA, MCE and initiator represents used amount (% by mass) with respect to the total monomer components.

Experimental Examples 13 to 17 and 20 are examples such that used amount and kind of nitrogen-containing basic compound were changed. Experimental Example 14 has smaller used amount of triethanolamine than Experimental Example 13, so that electrical conductivity thereof is lowered. Experimental Example 15 is an example such that primary alkanolamine was used as nitrogen-containing basic compound, and Experimental Example 20 is an example such that secondary alkanolamine was used as nitrogen-containing basic compound; both of the Experimental Examples have metal content and electrical conductivity as the same degree as Experimental Example 13. Experimental Example 16 is an example such that triethanolamine was replaced with ammonia, and Experimental Example 17 is an example such that triethanolamine was replaced with triethylamine. In both of the Experimental Examples, metal content and electrical conductivity are suppressed to low level, but yet electrical conductivity is somewhat high as compared with Experimental Examples such that alkanolamine was used.

Experimental Examples 18 and 19 are examples such that nitrogen-containing basic compound was not used and peroxide initiator was used. These Experimental Examples have high electrical conductivity as compared with other Experimental Examples such that nitrogen-containing basic compound and azo initiator were used and other physical property values of these Experimental Examples are outside of favorable range.

Experimental Example 21 is an example such that polymerization ratio of N-vinylpyrrolidone at the end of adding 2-hydroxyethyl acrylate is lower than Experimental Examples 1 to 17 and 20; in this example, it is understood that PVP homopolymer content becomes higher.

Experimental Example 22 is an example such that 2-hydroxyethyl acrylate was replaced with 2-hydroxyethyl methacrylate. Similarly to the case using of 2-hydroxyethyl acrylate, in the case of using 2-hydroxyethyl methacrylate also allows copolymerization properties in the same degree.

Experimental Example 23 is an example such that polymer solution obtained by adopting the same conditions as Experimental Example 9 was treated with ion-exchange resin. It can be confirmed from Table 3 that metal content is decreased in Experimental Example 23 treated with ion-exchange resin as compared with Experimental Example 9.

The method of the present invention easily provides a vinylpyrrolidone-based copolymer, in which low water insoluble matter content and/or low degree of dispersion can be achieved, and vinylpyrrolidone homopolymer amount and metal content are decreased, while having as essential components N-vinylpyrrolidone and hydroxyl group-containing (meth)acrylate, that is, a copolymer of N-vinylpyrrolidone and hydroxyl group-containing (meth)acrylate, which gives a favorable crosslinked coating film.

The vinylpyrrolidone-based copolymer according to the present invention is suitably used as a raw material polymer for a curable resin composition, which provides a film with a low metal content having a water resistance and hydrophilicity together.

The present invention has been fully described by way of Examples, it is to be understood that various changes and modifications will be apparent to those skilled in the art. Therefore, unless such changes and modifications depart from the scope of the present invention defined below, they should be construed as being included therein. The scope of the present invention, therefore, should be determined by the following claims.

The Japanese Patent Laid-open (Kokai) Publications cited above are incorporated herein by reference.

The invention claimed is:

1. A method for production of a vinylpyrrolidone-based copolymer by using a metallic reaction vessel,
   wherein the vinylpyrrolidone-based copolymer comprises:
   a constitutional unit (A) derived from N-vinylpyrrolidone and a constitutional unit (B) derived from hydroxyl group-containing (meth)acrylate at a ratio such that the constitutional unit (A) is 50 to 95% by mass and the constitutional unit (B) is 5 to 50% by mass with respect to the total of both, wherein:
   K value according to Fikentscher is 12 or more;
   water insoluble matter is 0.5% by mass (on the basis of solid content) or less; and
   each content of iron, nickel, chromium, sodium and calcium is 500 ppb (on the basis of mass; the same hereinafter or less, and wherein:
   polymerization is performed by using a nitrogen-containing basic compound in an amount of 0.0001 to 0.5% by mass with respect to a monomer component, a nonionic azo initiator and a solvent containing an alcohol having 1 to 5 carbon atoms by 10% by mass (ratio with respect to the total solvent) or more; and
   polymerization reaction is performed so that 0 to 100% by mass in 100% by mass of N-vinylpyrrolidone and 0 to 10% by mass in 100% by mass of hydroxyl group-containing (meth)acrylate are initially charged into said reaction vessel and the residuals of N-vinylpyrrolidone and hydroxyl group-containing (meth)acrylate are successively added into the reaction vessel.

2. A method for production of a vinylpyrrolidone-based copolymer by using a metallic reaction vessel,
   wherein the vinylpyrrolidone-based copolymer comprises:
   a constitutional unit (A) derived from N-vinylpyrrolidone and a constitutional unit (B) derived from hydroxyl group-containing (meth)acrylate at a ratio such that the constitutional unit (A) is 50 to 95% by mass and the constitutional unit (B) is 5 to 50% by mass with respect to the total of both, wherein:
   K value according to Fikentscher is 12 or more;
   water insoluble matter is 0.5% by mass (on the basis of solid content) or less; and
   each content of iron, nickel, chromium, sodium and calcium is 500 ppb (on the basis of mass; the same hereinafter or less, and wherein:
   polymerization is performed by using a nitrogen-containing basic compound in an amount of 0.0001 to 0.5% by mass with respect to a monomer component, a nonionic azo initiator and a solvent containing an alcohol having 1 to 5 carbon atoms by 10% by mass (ratio with respect to the total solvent) or more; and
   polymerization reaction is performed so that 0 to 100% by mass in 100% by mass of N-vinylpyrrolidone and 0 to 10% by mass in 100% by mass of hydroxyl group-containing (meth)acrylate are initially charged into said reaction vessel and the residuals of N-vinylpyrrolidone and hydroxyl group-containing (meth)acrylate are successively added into the reaction vessel.

3. The method for production of a vinylpyrrolidone-based copolymer according to claim 1, wherein a content of the constitutional unit (A) derived from N-vinylpyrrolidone and the constitutional unit (B) derived from hydroxy group-containing (meth)acrylate is 80% by mass or more in the total constitutional units.

4. The method for production of a vinylpyrrolidone-based copolymer according to claim 2, wherein a content of the constitutional unit (A) derived from N-vinylpyrrolidone and the constitutional unit (B) derived from hydroxy group-containing (meth)acrylate is 80% by mass or more in the total constitutional units.

5. The method for production of a vinylpyrrolidone-based copolymer according to claim 1, wherein alkanolamine is used as said nitrogen-containing basic compound in an amount of 0.01 to 0.5% by mass with respect to a monomer component.

6. The method for production of a vinylpyrrolidone-based copolymer according to claim 2, wherein alkanolamine is used as said nitrogen-containing basic compound in an amount of 0.01 to 0.5% by mass with respect to a monomer component.

7. The method for production of a vinylpyrrolidone-based copolymer according to claim 3, wherein alkanolamine is used as said nitrogen-containing basic compound in an amount of 0.01 to 0.5% by mass with respect to a monomer component.

8. The method for production of a vinylpyrrolidone-based copolymer according to claim 4, wherein alkanolamine is used as said nitrogen-containing basic compound in an amount of 0.01 to 0.5% by mass with respect to a monomer component.

9. A method for production of a vinylpyrrolidone-based copolymer,
wherein the vinylpyrrolidone-based copolymer comprises:
a constitutional unit (A) derived from N-vinylpyrrolidone and a constitutional unit (B) derived from hydroxyl group-containing (meth)acrylate at a ratio such that the constitutional unit (A) is 50 to 95% by mass and the constitutional unit (B) is 5 to 50% by mass with respect to the total of both, wherein:
K value according to Fikentscher is 12 or more;
water insoluble matter is 0.5% by mass (on the basis of solid content) or less; and
each content of iron, nickel, chromium, sodium and calcium is 500 ppb (on the basis of mass; the same hereinafter or less, and wherein:
polymerization reaction is performed by using a solvent containing an alcohol having 1 to 5 carbon atoms by 10% by mass (ratio with respect to the total solvent) or more to treat an obtained polymerization product with an ion-exchange resin.

10. A method for production of a vinylpyrrolidone-based copolymer,
wherein the vinylpyrrolidone-based copolymer comprises:
a constitutional unit (A) derived from N-vinylpyrrolidone and a constitutional unit (B) derived from hydroxyl group-containing (meth)acrylate at a ratio such that the constitutional unit (A) is 50 to 95% by mass and the constitutional unit (B) is 5 to 50% by mass with respect to the total of both, wherein:
K value according to Fikentscher is 12 or more;
water insoluble matter is 0.5% by mass (on the basis of solid content) or less; and
each content of iron, nickel, chromium, sodium and calcium is 500 ppb (on the basis of mass; the same hereinafter or less, and wherein:
hydroxyl group-containing (meth)acrylate is successively added to a reaction solution with an unreacted N-vinylpyrrolidone concentration of 10 ppm or more;
polymerization ratio of N-vinylpyrrolidone at the end of adding hydroxyl group-containing (meth)acrylate is 98% or more; and
an obtained polymerization product is treated with an ion-exchange resin.

11. A method for production of a vinylpyrrolidone-based copolymer,
wherein the vinylpyrrolidone-based copolymer comprises:
a constitutional unit (A) derived from N-vinylpyrrolidone and a constitutional unit (B) derived from hydroxyl group-containing (meth)acrylate at a ratio such that said (A) is 50 to 95% by mass and the constitutional unit (B) is 5 to 50% by mass with respect to the total of both, wherein: a vinylpyrrolidone homopolymer content is 3% by mass (on the basis of solid content) or less, and wherein:
hydroxyl group-containing (meth)acrylate is successively added to a reaction solution having an unreacted N-vinylpyrrolidone concentration of 10 ppm or more; and
polymerization ratio of N-vinylpyrrolidone at the end of adding hydroxyl group-containing (meth)acrylate is 98% or more.

12. The method for production of a vinylpyrrolidone-based copolymer according to claim 11, wherein polymerization reaction is performed by using a nitrogen-containing basic compound in an amount of 0.0001 to 0.5% by mass with respect to a monomer component, a nonionic azo initiator and a solvent containing an alcohol having 1 to 5 carbon atoms by 10% by mass (ratio with respect to the total solvent) or more.

* * * * *